United States Patent
Chen

(10) Patent No.: US 10,554,532 B2
(45) Date of Patent: Feb. 4, 2020

(54) METHOD AND DEVICE FOR ESTABLISHING PERFORMANCE MEASUREMENT TASK AND PROCESSING PERFORMANCE MEASUREMENT RESULT

(71) Applicant: ZTE CORPORATION, Shenzhen, Guangdong Province (CN)

(72) Inventor: Liping Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 419 days.

(21) Appl. No.: 15/324,729

(22) PCT Filed: Nov. 24, 2014

(86) PCT No.: PCT/CN2014/092071
§ 371 (c)(1),
(2) Date: Jun. 6, 2017

(87) PCT Pub. No.: WO2015/154478
PCT Pub. Date: Oct. 15, 2015

(65) Prior Publication Data
US 2017/0272354 A1      Sep. 21, 2017

(30) Foreign Application Priority Data
Jul. 10, 2014    (CN) .......................... 2014 1 0326757

(51) Int. Cl.
*G06F 15/16*         (2006.01)
*H04L 12/26*         (2006.01)
*G06F 9/455*         (2018.01)

(52) U.S. Cl.
CPC .... *H04L 43/50* (2013.01); *G06F 2009/45591* (2013.01)

(58) Field of Classification Search
CPC ............................................ G06F 2009/45591
See application file for complete search history.

(56) References Cited

U.S. PATENT DOCUMENTS

2014/0052852 A1    2/2014  Dufour et al.
2015/0358248 A1*  12/2015  Saha ................... H04L 43/0817
                                                         709/226
(Continued)

FOREIGN PATENT DOCUMENTS

| CN | 102149127 A  | 8/2011 |
| CN | 103168445 A  | 6/2013 |
| EP | 2590363 A1   | 5/2013 |

OTHER PUBLICATIONS

ETSI, Network Functions Virtualisation, Infrastructure Architecture, Architecture of the Hypervisor Domain, Draft ETSI GS NFV-INF 004 v0.3.1, May 2014, XP014181628.

(Continued)

*Primary Examiner* — Hieu T Hoang
(74) *Attorney, Agent, or Firm* — Knobbe Martens Olson & Bear LLP

(57) ABSTRACT

The present disclosure discloses a processing method and apparatus for creating a performance measurement task and processing performance measurement results. In the above-mentioned method, performance measurement objects and a correspondence between virtual network functions (VNFs) and the performance measurement objects are established in a management information base; a first performance measurement task creating message from an operation support system (OSS) or a network management system (NMS) is received; and performance measurement results are acquired from the VNFs according to the first performance measurement task creating message, and a performance measurement file is reported to the OSS or the NMS, herein the performance measurement results are carried in the performance measurement file. Implementation of comprehensive and effective assessment of the quality of the VNFs and the processing capacity of a virtual network device is facilitated (Continued)

according to the technical schemes provided by the present disclosure.

20 Claims, 7 Drawing Sheets

(56) References Cited

U.S. PATENT DOCUMENTS

2016/0328258 A1* 11/2016 Iwashina ............. G06F 9/45533
2016/0335111 A1* 11/2016 Bruun ................. G06F 9/45558
2016/0364226 A1* 12/2016 Takano ..................... G06F 8/65
2017/0005935 A1*  1/2017 Tao .................... H04L 12/6418
2017/0220371 A1*  8/2017 Kosugi ................ H04W 24/02

OTHER PUBLICATIONS

ETSI, Network Function Virtualization, Service Quality Metrics, GS INF 010, Jul. 2014, XP014227410.

* cited by examiner

METHOD AND DEVICE FOR ESTABLISHING PERFORMANCE MEASUREMENT TASK AND PROCESSING PERFORMANCE MEASUREMENT RESULT

TECHNICAL FIELD

The present disclosure relates to the field of communications, and more particularly to a processing method and apparatus for creating a performance measurement task and processing performance measurement results.

BACKGROUND

In the existing network architecture, there is a super-strong coupling relationship between network functions and network devices, and the network functions are all implemented by specifically designed devices exclusive to manufacturers, thus bringing many inconveniences. For example, improvement in the performance of these devices is limited by satisfaction of specific/customized demands while keeping the development of hardware with carrier-grade reliability. As another example, when an operator needs to deploy a new service, it is necessary to deploy a newly designed device having a related dedicated function, which will increase the service deployment cost of the operator. On the other hand, with the rapid improvement of the performances of central processing units and memories, a basic condition is provided for running the network functions on general servers in a software form. A network function virtualization (NFV) technology emerges as the times require, and its aim is to run the network functions on general hardware devices, so as to reduce capital expenditure by large scale deployment. "Virtualization" enables the network functions to be deployed and updated as needed, greatly facilitates remote management and maintenance, and may reduce the operation cost.

FIG. 1 is a schematic diagram of an architecture and a reference point for NFV management and orchestration (NFV-MANO) according to the related art. As shown in FIG. 1, a network functions virtualization orchestrator (NFVO) is responsible for functions such as life cycle management of network services, resource scheduling of a network functions virtualization infrastructure (NFVI) of a cross-virtualized infrastructure manager (VIM), etc., a virtualized network functions manager (VNFM) is responsible for life cycle management of VNF instances, each of the VNF instances being supposed to have a related VNFM, and the virtualized infrastructure manager (VIM) is responsible for controlling and managing the NFVI to calculate and store network resources.

As the network functions are virtualized, performance measurement of a virtual network function application layer is executed by VNFs, and may be directly sent to an element management (EM) or the VNFM by the VNFs, and performance measurement related to the network resources is acquired from the VIM by an operation support system (OSS)/network management system (NMS) via the NFVO. Performance measurement data is mainly used for assessing the quality of the network services or the utilization rate of the network resources and the processing capacity of the network devices.

The performance measurement related to the network resources may be related to specific VNFs according to an ETSI GS NFV-MANO. However, if the performance measurement of the VNF application layer is reported to an element management system (EMS), the EMS sends performance information to the OSS/NMS according to a performance management mode of a network management northbound interface in the related art, and the OSS/NMS cannot relate performance measurement items of the application layer to the specific VNFs. That is because performance measurement objects at the northbound interface are all identified by distinguish names (DN).

FIG. 2 is a flowchart of a method of executing performance management by a network manager according to the related art. As shown in FIG. 2, the method may include the following processing steps:

Step S202: an OSS/NMS creating a performance measurement task via a measurement object DN identity;

Step S204: an EMS creating a performance measurement task;

Step S206: an element reporting performance measurement results;

Step S208: the EMS reporting a performance measurement file via the measurement object DN identity; and Step S210: the OSS/NMS statistically analyzing all performance measurement results of each element, and assessing the quality of network functions and the processing capacity of network devices.

It should be noted that if VNFs to which the performance measurement results belong cannot be determined, all performance measurement information of the VNFs cannot be collected when performance measurement data is statistically analyzed, and the quality of the network functions provided by the VNFs and the processing capacity of virtual network devices cannot be comprehensively and effectively assessed.

SUMMARY

Embodiments of the present disclosure provide a method and apparatus for creating a performance measurement task and processing performance measurement results, so as to at least solve the problem in the related art that VNFs to which performance measurement results belong cannot be determined.

According to an aspect of the present disclosure, a processing method for creating a performance measurement task is provided.

The processing method for creating the performance measurement task according to an embodiment of the present disclosure includes: establishing performance measurement objects and a correspondence between virtual network functions (VNFs) and the performance measurement objects in a management information base; receiving a first performance measurement task creating message from an operation support system (OSS) or a network management system (NMS); and acquiring performance measurement results from the VNFs according to the first performance measurement task creating message, and reporting a performance measurement file to the OSS or the NMS, herein the performance measurement results are carried in the performance measurement file.

Alternatively, acquiring performance measurement results from the VNFs according to the first performance measurement task creating message includes: acquiring first identification information of the performance measurement objects from the first performance measurement task creating message; determining second identification information of the VNFs, corresponding to the first identification information; and acquiring the performance measurement results from the VNFs according to the second identification information.

Alternatively, acquiring performance measurement results from the VNFs according to the first performance measurement task creating message includes: acquiring the second identification information of the VNFs from the first performance measurement task creating message; and acquiring the performance measurement results from the VNFs according to the second identification information.

Alternatively, acquiring the performance measurement results from the VNFs according to the second identification information includes: sending a second performance measurement task creating message to the VNFs according to the second identification information; and receiving the performance measurement results from the VNFs, and generating the performance measurement file according to a pre-set performance measurement file template, herein the performance measurement results are carried in the performance measurement file.

Alternatively, the second identification information is further carried in the performance measurement file, herein the second identification information is used by the OSS or the NMS for determining the VNFs to which the performance measurement results belong.

Alternatively, the performance measurement objects include network function object instances. Establishing a correspondence between VNFs and the performance measurement objects in a management information base includes: adding VNF object instances to the management information base, herein the second identification information of the VNFs is contained in the VNF object instances; establishing an association between the VNF object instances and the network function object instances, herein related attribute information corresponding to the network function object instances is added to the VNF object instances and related attribute information corresponding to the VNF object instances is added to the network function object instances; or establishing an inclusion relation between the VNF object instances and the network function object instances.

Alternatively, the performance measurement objects include: network function object instances, link object instances and link endpoint object instances. Establishing a correspondence between VNFs and the performance measurement objects in a management information base includes: adding VNF object instances and virtual link (VL) object instances to the management information base, herein the second identification information of the VNFs is contained in the VNF object instances, and third identification information of VLs is contained in the VL object instances; establishing an association between the VNF object instances and the network function object instances, herein related attribute information corresponding to the network function object instances is added to the VNF object instances and related attribute information corresponding to the VNF object instances is added to the network function object instances; or establishing an inclusion relation between the VNF object instances and the network function object instances; establishing an association between the VL object instances and the link object instances, herein related attribute information corresponding to the link object instances is added to the VL object instances and related attribute information corresponding to the VL object instances is added to the link object instances; and establishing an association between the VL object instances and the link endpoint object instances, herein related attribute information corresponding to the link endpoint object instances is added to the VL object instances and related attribute information corresponding to the VL object instances is added to the link endpoint object instances.

Alternatively, the performance measurement objects include: network function object instances, link object instances and link endpoint object instances. Establishing a correspondence between VNFs and the performance measurement objects in a management information base includes: adding the second identification information of the VNFs to the network function object instances; and adding third identification information of VLs to the link object instances or the link endpoint object instances.

Alternatively, the related attribute information corresponding to the VNF object instances or the second identification information of the VNFs is carried in a header of the performance measurement file and/or an element identity attribute of the performance measurement file; and the related attribute information corresponding to the VL object instances or the third identification information of the VLs is carried in a measurement value attribute of the performance measurement file.

According to another aspect of the present disclosure, a method for processing performance measurement results is provided.

The method for processing the performance measurement results according to an embodiment of the present disclosure includes: sending a performance measurement task creating message to an element management system (EMS); receiving a performance measurement file from the EMS, herein a first performance measurement result is carried in the performance measurement file, and the first performance measurement result is acquired by the EMS from virtual network functions (VNFs); and determining the VNFs to which the first performance measurement result belongs according to the performance measurement file.

Alternatively, the EMS acquiring the first performance measurement result from the VNFs includes one of: the EMS acquiring first identification information of performance measurement objects from the performance measurement task creating message, determining second identification information of the VNFs, corresponding to the first identification information, and then acquiring the first performance measurement result from the VNFs according to the second identification information; or the EMS acquiring second identification information from the performance measurement task creating message, and then acquiring the first performance measurement result from the VNFs according to the second identification information.

Alternatively, after the VNFs to which the first performance measurement result belongs are determined according to the performance measurement file, the method further includes: acquiring a second performance measurement result corresponding to the second identification information from a network functions virtualization orchestrator (NFVO); and statistically analyzing the first performance measurement result and the second performance measurement result, assessing quality of network services provided by the VNFs, and/or determining whether VNF capacity is required to be adjusted.

According to a further aspect of the present disclosure, another method for processing performance measurement results is provided.

The method for processing the performance measurement results according to an embodiment of the present disclosure includes: sending a performance measurement task creating message to an element management system (EMS); receiving a performance measurement file from the EMS, herein a first performance measurement result is carried in the performance measurement file, and the first performance measurement result is acquired from virtual network functions (VNFs) by the EMS; and determining the VNFs and/or virtual links (VLs) to which the first performance measurement result belongs according to a correspondence between performance measurement objects and the VNFs, established in a management information base.

Alternatively, the EMS acquiring the first performance measurement result from VNFs includes one of: the EMS acquiring first identification information of the performance measurement objects from a performance measurement task creating message, determining second identification information of the VNFs, corresponding to the first identification information, and then acquiring the first performance measurement result from the VNFs according to the second identification information; or the EMS acquiring second identification information from a performance measurement task creating message, and then acquiring the first performance measurement result from the VNFs according to the second identification information.

Alternatively, after the VNFs and/or virtual links (VLs) to which the first performance measurement result belongs are determined according to the correspondence, the method further includes: acquiring a second performance measurement result corresponding to the second identification information from a network functions virtualization orchestrator (NFVO); and statistically analyzing the first performance measurement result and the second performance measurement result, assessing quality of network services provided by the VNFs, and/or determining whether VNF capacity is required to be adjusted.

Alternatively, the performance measurement objects are network function object instances. Determining the VNFs to which the first performance measurement result belongs according to a correspondence includes one of: reading related attribute information corresponding to VNF object instances in the network function object instances, then reading second identification information in the VNF object instances represented by the related attribute information, and determining the VNFs to which the first performance measurement result belongs according to the second identification information; or reading second identification information in VNF object instances containing the network function object instances, and determining the VNFs to which the first performance measurement result belongs according to the second identification information; or reading second identification information of the VNFs in attributes of the network function object instances, and determining the VNFs to which the first performance measurement result belongs according to the second identification information of the VNFs.

Alternatively, the performance measurement objects are link object instances. Determining the VNFs to which the first performance measurement result belongs according to a correspondence includes one of: determining VNFs to which network function object instances related to the link object instances belong, and using the VNFs as the VNFs to which the first performance measurement result belongs; or reading second identification information from the VNF object instances containing VL object instances, and determining the VNFs to which the first performance measurement result belongs according to the second identification information.

Alternatively, the performance measurement objects are link object instances. Determining VLs to which the first performance measurement result belongs according to a correspondence includes one of: reading related attribute information corresponding to the VLs in the link object instances, then reading third identification information of the VLs in the VL object instances represented by the related attribute information, and determining the VLs to which the first performance measurement result belongs according to the third identification information; or reading third identification information in attributes of the link object instances, and determining the VLs to which the first performance measurement result belongs according to the third identification information.

Alternatively, the performance measurement objects are link endpoint object instances. Determining the VNFs to which the first performance measurement result belongs according to a correspondence includes one of: determining VNFs to which network function object instances containing the link endpoint object instances belong, and using the VNFs as the VNFs to which the first performance measurement result belongs; or reading second identification information from VNF object instances containing VL object instances, and determining the VNFs to which the first performance measurement result belongs according to the second identification information.

Alternatively, the performance measurement objects are link endpoint object instances. Determining VLs to which the first performance measurement result belongs according to a correspondence includes one of: reading related attribute information corresponding to the VLs in the link endpoint object instances, then reading third identification information of the VLs in the VL object instances represented by the related attribute information, and determining the VLs to which the first performance measurement result belongs according to the third identification information; or reading third identification information in attributes of the link endpoint object instances, and determining the VLs to which the first performance measurement result belongs according to the third identification information.

According to a further aspect of the present disclosure, a processing apparatus for creating a performance measurement task is provided.

The processing apparatus for creating the performance measurement task according to an embodiment of the present disclosure includes: an establishment module arranged to establish performance measurement objects and a correspondence between virtual network functions (VNFs) and the performance measurement objects in a management information base; a receiving module arranged to receive a first performance measurement task creating message from an operation support system (OSS) or a network management system (NMS); and a processing module arranged to acquire performance measurement results from the VNFs according to the first performance measurement task creating message, and report a performance measurement file to the OSS or the NMS, herein the performance measurement results are carried in the performance measurement file.

Alternatively, the processing module includes: a first acquisition unit arranged to acquire first identification information of the performance measurement objects from the first performance measurement task creating message; a determination unit arranged to determine second identification information of the VNFs, corresponding to the first identification information; and a second acquisition unit arranged to acquire the performance measurement results from the VNFs according to the second identification information.

Alternatively, the processing module includes: a third acquisition unit arranged to acquire the second identification information of the VNFs from the first performance measurement task creating message; and a fourth acquisition unit arranged to acquire the performance measurement results from the VNFs according to the second identification information.

Alternatively, both the second acquisition unit and the fourth acquisition unit include: a sending subunit arranged to send a second performance measurement task creating message to the VNFs according to the second identification information; and a receiving subunit arranged to receive the performance measurement results from the VNFs, and generate the performance measurement file according to a pre-set performance measurement file template, herein the performance measurement results are carried in the performance measurement file.

Alternatively, the second identification information is further carried in the performance measurement file, herein the second identification information is used by the OSS or the NMS for determining the VNFs to which the performance measurement results belong.

Alternatively, the performance measurement objects include network function object instances. The establishment module includes: a first adding unit arranged to add VNF object instances to the management information base, herein the second identification information of the VNFs is contained in the VNF object instances; and a first establishment unit arranged to: establish an association between the VNF object instances and the network function object instances, herein related attribute information corresponding to the network function object instances is added to the VNF object instances and related attribute information corresponding to the VNF object instances is added to the network function object instances; or establish an inclusion relation between the VNF object instances and the network function object instances.

Alternatively, the performance measurement objects include: network function object instances, link object instances and link endpoint object instances. The establishment module includes: a second adding unit arranged to add VNF object instances and virtual link (VL) object instances to the management information base, herein the second identification information of the VNFs is contained in the VNF object instances, and third identification information of VLs is contained in the VL object instances; a second establishment unit arranged to establish an inclusion relation between the VNF object instances and the network function object instances; a third establishment unit arranged to establish an association between the VL object instances and the link object instances, herein related attribute information corresponding to the link object instances is added to the VL object instances and related attribute information corresponding to the VL object instances is added to the link object instances; and a fourth establishment unit arranged to establish an association between the VL object instances and the link endpoint object instances, herein related attribute information corresponding to the link endpoint object instances is added to the VL object instances and related attribute information corresponding to the VL object instances is added to the link endpoint object instances.

Alternatively, the performance measurement objects include: network function object instances, link object instances and link endpoint object instances. The establishment module includes: a first adding unit arranged to add the second identification information of the VNFs to the network function object instances; and a second adding unit arranged to add third identification information of VLs to the link object instances or the link endpoint object instances.

Alternatively, the related attribute information corresponding to the VNF object instances or the second identification information of the VNFs is carried in a header of the performance measurement file and/or an element identity attribute of the performance measurement file; and the related attribute information corresponding to the VL object instances or the third identification information of the VLs is carried in a measurement value attribute of the performance measurement file.

According to a further aspect of the present disclosure, an apparatus for processing performance measurement results is provided.

The apparatus for processing the performance measurement results according to an embodiment of the present disclosure includes: a sending module arranged to send a performance measurement task creating message to an element management system (EMS); a receiving module arranged to receive a performance measurement file from the EMS, herein a first performance measurement result is carried in the performance measurement file, and the first performance measurement result is acquired from virtual network functions (VNFs) by the EMS; and a determination module arranged to determine the VNFs to which the first performance measurement result belongs according to the performance measurement file.

Alternatively, the EMS acquiring the first performance measurement result from the VNFs includes one of: the EMS acquiring first identification information of performance measurement objects from the performance measurement task creating message, determining second identification information of the VNFs, corresponding to the first identification information, and then acquiring the first performance measurement result from the VNFs according to the second identification information; or the EMS acquiring second identification information from the performance measurement task creating message, and then acquiring the first performance measurement result from the VNFs according to the second identification information.

Alternatively, the above-mentioned apparatus further includes: an acquisition module arranged to acquire a second performance measurement result corresponding to the second identification information from a network functions virtualization orchestrator (NFVO); and an analysis module arranged to statistically analyze the first performance measurement result and the second performance measurement result, assess quality of network services provided by the VNFs, and/or determine whether VNF capacity is required to be adjusted.

According to a further aspect of the present disclosure, another apparatus for processing performance measurement results is provided.

The apparatus for processing the performance measurement results according to an embodiment of the present disclosure includes: a sending module arranged to send a performance measurement task creating message to an element management system (EMS); a receiving module arranged to receive a performance measurement file from the EMS, herein a first performance measurement result is carried in the performance measurement file, and the first performance measurement result is acquired from virtual network functions (VNFs) by the EMS; and a determination module arranged to determine the VNFs and/or virtual links (VLs) to which the first performance measurement result belongs according to a correspondence between performance measurement objects and the VNFs, established in a management information base.

Alternatively, the EMS acquiring the first performance measurement result from VNFs includes one of: the EMS acquiring first identification information of the performance measurement objects from a performance measurement task creating message, determining second identification information of the VNFs, corresponding to the first identification information, and then acquiring the first performance measurement result from the VNFs according to the second identification information; or the EMS acquiring second identification information from a performance measurement task creating message, and then acquiring the first performance measurement result from the VNFs according to the second identification information.

Alternatively, the above-mentioned apparatus further includes: an acquisition module arranged to acquire a second performance measurement result corresponding to the second identification information from a network functions virtualization orchestrator (NFVO); and an analysis module arranged to statistically analyze the first performance measurement result and the second performance measurement result, assess quality of network services provided by the VNFs, and/or determine whether VNF capacity is required to be adjusted.

Alternatively, the performance measurement objects are network function object instances. The determination module is arranged to: read related attribute information corresponding to VNF object instances in the network function object instances, then read second identification information in the VNF object instances represented by the related attribute information, and determine the VNFs to which the first performance measurement result belongs according to the second identification information; or read second identification information in VNF object instances containing the network function object instances, and determine the VNFs to which the first performance measurement result belongs according to the second identification information; or read second identification information of the VNFs in attributes of the network function object instances, and determine the VNFs to which the first performance measurement result belongs according to the second identification information of the VNFs.

Alternatively, the performance measurement objects are link object instances. The determination module is arranged to: determine VNFs to which network function object instances related to the link object instances belong, and use the VNFs as the VNFs to which the first performance measurement result belongs; or read second identification information from the VNF object instances containing VL object instances, and determine the VNFs to which the first performance measurement result belongs according to the second identification information.

Alternatively, the performance measurement objects are link object instances. The determination module is arranged to: read related attribute information corresponding to the VLs in the link object instances, then read third identification information of the VLs in the VL object instances represented by the related attribute information, and determine the VLs to which the first performance measurement result belongs according to the third identification information; or read third identification information in attributes of the link object instances, and determine the VLs to which the first performance measurement result belongs according to the third identification information.

Alternatively, the performance measurement objects are link endpoint object instances. The determination module is arranged to: determine VNFs to which network function object instances containing the link endpoint object instances belong, and use the VNFs as the VNFs to which the first performance measurement result belongs; or read second identification information from VNF object instances containing VL object instances, and determine the VNFs to which the first performance measurement result belongs according to the second identification information.

Alternatively, the performance measurement objects are link endpoint object instances. The determination module is arranged to: read related attribute information corresponding to the VLs in the link endpoint object instances, then read third identification information of the VLs in the VL object instances represented by the related attribute information, and determine the VLs to which the first performance measurement result belongs according to the third identification information; or read third identification information in attributes of the link endpoint object instances, and determine the VLs to which the first performance measurement result belongs according to the third identification information.

By means of the embodiments of the present disclosure, the performance measurement objects and the correspondence between the VNFs and the performance measurement objects are established in the management information base; the first performance measurement task creating message from the OSS or the NMS is received; and the performance measurement results are acquired from the VNFs according to the first performance measurement task creating message, and the performance measurement file is reported to the OSS or the NMS, herein the performance measurement results are carried in the performance measurement file. The problem in the related art that the VNFs to which the performance measurement results belongs cannot be determined is solved, and performance measurement items of an application layer are further related to the specific VNFs, thereby facilitating implementation of comprehensive and effective assessment of the quality of the VNFs and the processing capacity of virtual network devices.

BRIEF DESCRIPTION OF DRAWINGS

The accompanying drawings described herein are used to provide further understanding of the present disclosure, and form a part of the present application. Schematic embodiments and descriptions of the present disclosure are used to explain the present disclosure, and do not form improper limitations to the present disclosure. In the accompanying drawings.

DETAILED DESCRIPTION

The present disclosure will be elaborated hereinbelow with reference to the accompanying drawings and in combination with the embodiments. It should be noted that the embodiments in the present application and features in the embodiments may be combined with each other in the case of no conflict.

Figure 1:
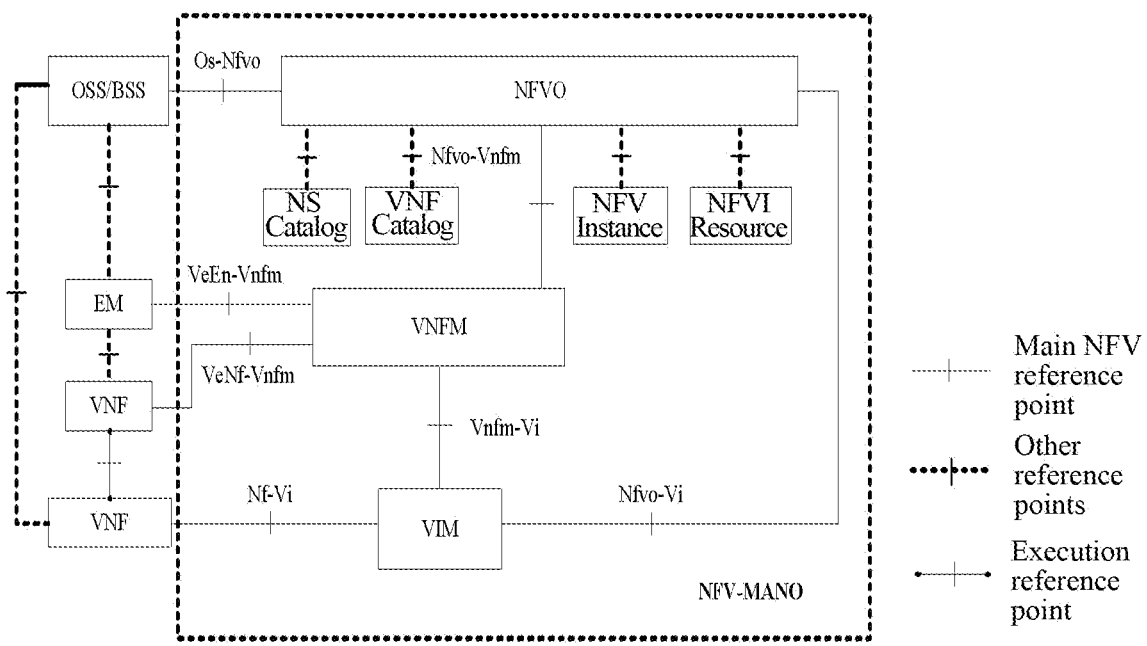
FIG. 1 is a schematic diagram of an architecture and a reference point for NFV management and orchestration according to the related art.
Figure 2:
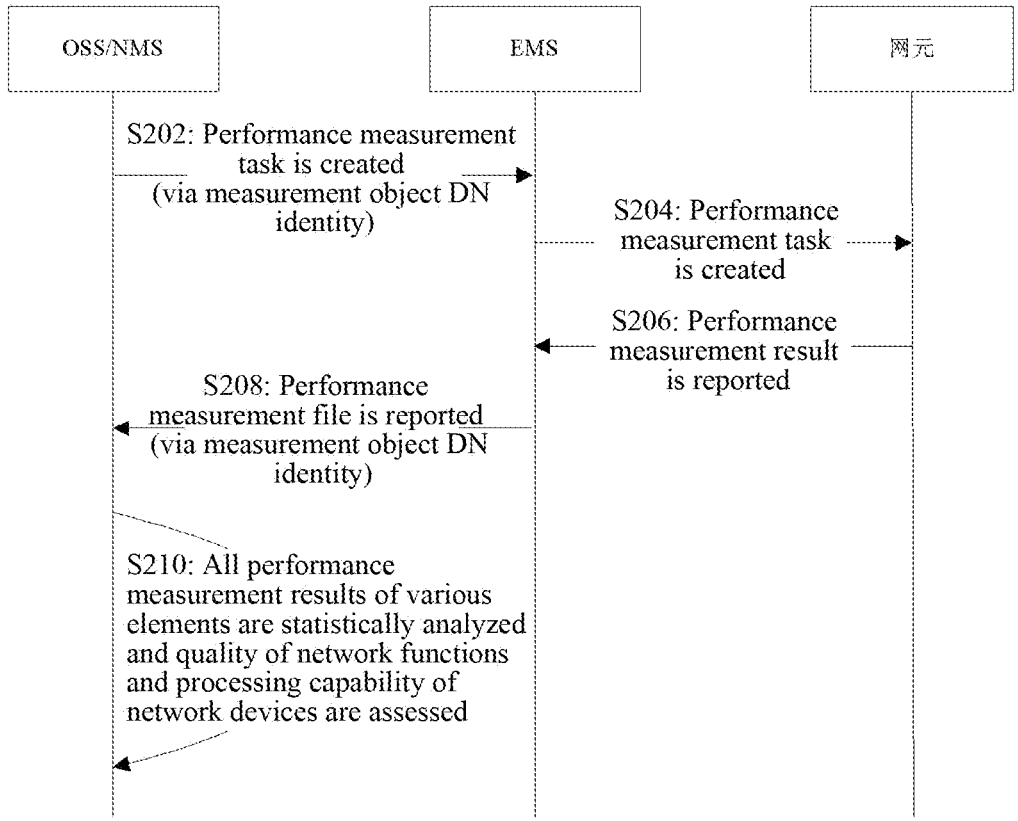
FIG. 2 is a flowchart of a method of executing performance management by a network manager according to the related art.
Figure 3:
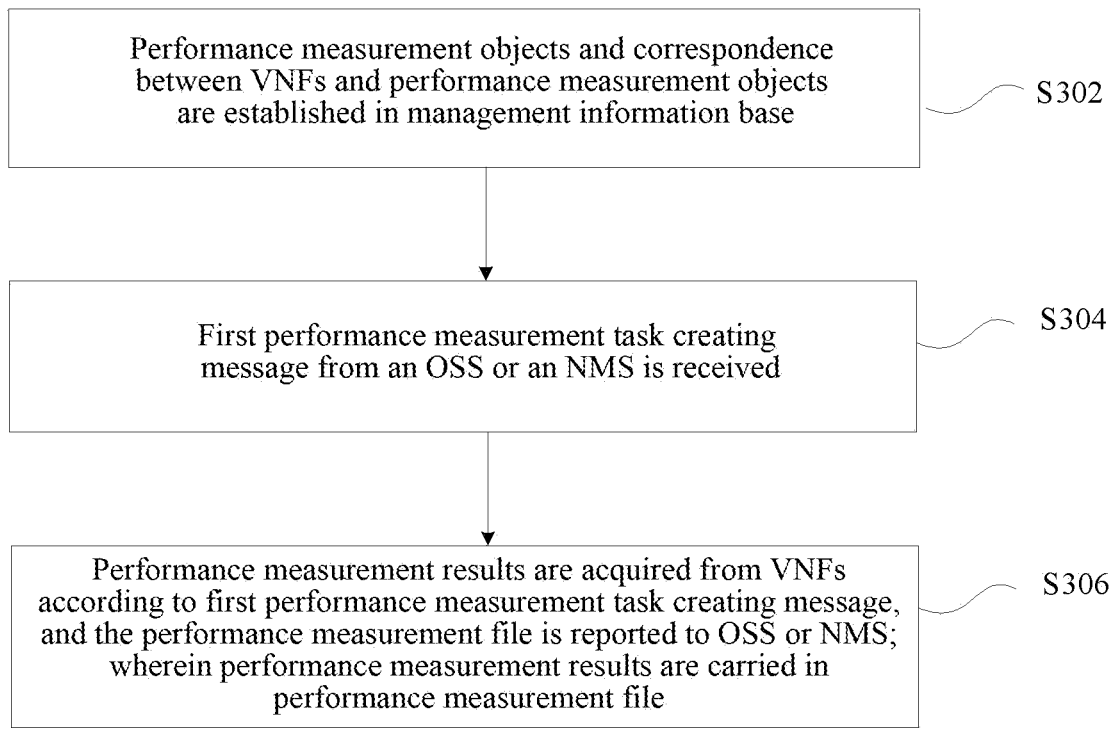
FIG. 3 is a flowchart of a processing method for creating a performance measurement task according to an embodiment of the present disclosure.

FIG. 3 is a flowchart of a processing method for creating a performance measurement task according to an embodiment of the present disclosure. As shown in FIG. 3, the method may include the following steps:

Step S302: establishing performance measurement objects and a correspondence between VNFs and the performance measurement objects in a management information base;

Step S304: receiving a first performance measurement task creating message from an OSS or an NMS; and Step S306: acquiring performance measurement results from the VNFs according to the first performance measurement task creating message, and reporting a performance measurement file to the OSS or the NMS, herein the performance measurement results are carried in the performance measurement file.

The VNFs to which performance measurement results belong cannot be determined in the related art. By using the method as shown in FIG. 3, an EMS establishes the correspondence between the performance measurement objects and the VNFs after the network functions are virtualized in the management information base, after the OSS or the NMS sends the performance measurement task creating message to instruct the EMS to measure the performance measurement objects, the EMS may seek out, according to identification information of the performance measurement objects, identification information of the VNFs corresponding thereto from the above-mentioned correspondence, then the EMS acquires the performance measurement results from the VNFs and reports them to the OSS or the NMS, and the OSS or the NMS may determine, by checking the management information base, the VNFs to which the performance measurement results belong.

In an embodiment, a one-to-one correspondence between identities of the performance measurement objects in a management system and identities after the network functions are virtualized may be established in the management information base, herein the correspondence may include, but is not limited to, a correspondence between object instances representative of the network functions and the VNF instances, a correspondence between object instances representative of links and virtual link (VL) instances, and a correspondence between object instances representative of link endpoints and the VL instances.

The correspondence between the object instances representative of the network functions and the VNF instances may include, but is not limited to, DNs of the object instances representative of the network functions, IDs of the VNF instances, and IP addresses of the VNF instances.

The correspondence between the object instances representative of the links and the VL instances may include, but is not limited to, DNs of the object instances representative of the links, and IDs of the VL instances.

The correspondence between the object instances representative of the link endpoints and the VL instances may include, but is not limited to, DNs of the object instances representative of the link endpoints, and IDs of the belonged VL instances.

Alternatively, in Step S306, acquiring the performance measurement results from the VNFs according to the first performance measurement task creating message may include the following steps:

Step S1: acquiring first identification information of the performance measurement objects from the first performance measurement task creating message;

Step S2: determining second identification information of the VNFs, corresponding to the first identification information; and Step S3: acquiring the performance measurement results from the VNFs according to the second identification information.

Alternatively, in Step S306, acquiring the performance measurement results from the VNFs according to the first performance measurement task creating message may include the following steps:

Step S4: acquiring second identification information of the VNFs from the first performance measurement task creating message; and Step S5: acquiring the performance measurement results from the VNFs according to the second identification information.

Alternatively, in Step S3 or Step S5, acquiring the performance measurement results from the VNFs according to the second identification information may include the following steps:

Step S51: sending a second performance measurement task creating message to the VNFs according to the second identification information; and Step S52: receiving the performance measurement results from the VNFs, and generating a performance measurement file according to a pre-set performance measurement file template, herein the performance measurement results are carried in the performance measurement file.

In an implementation process, the second identification information may further be carried in the above-mentioned performance measurement file, herein the second identification information is used by the OSS or the NMS for determining the VNFss to which the performance measurement results belongs.

In an embodiment, the EMS may query the correspondence in the management information base according to measurement object identities carried in the performance measurement task creating message of the OSS/NMS, determine IDs of the VNF instances and/or VL instances corresponding to the measurement objects, and send a created performance measurement task to the VNF instances. After receiving the performance measurement results sent by the VNFs, the EMS adds the ID information of the VNF instances and/or VL instances corresponding to the measurement objects when generating the performance measurement file according to the performance measurement file template.

Alternatively, the above-mentioned performance measurement objects may include network function object instances. In Step S302, establishing the correspondence between the performance measurement objects and the VNFs in the management information base may include the following steps:

Step S6: adding VNF object instances is to the management information base, herein the VNF object instances contain the second identification information of the VNFs; and Step S7: establishing an association between the VNF object instances and the network function object instances, herein related attribute information corresponding to the network function object instances is added to the VNF object instances and related attribute information corresponding to the VNF object instances is added to the network function object instances; or establishing an inclusion relation between the VNF object instances and the network function object instances.

Figure 4:
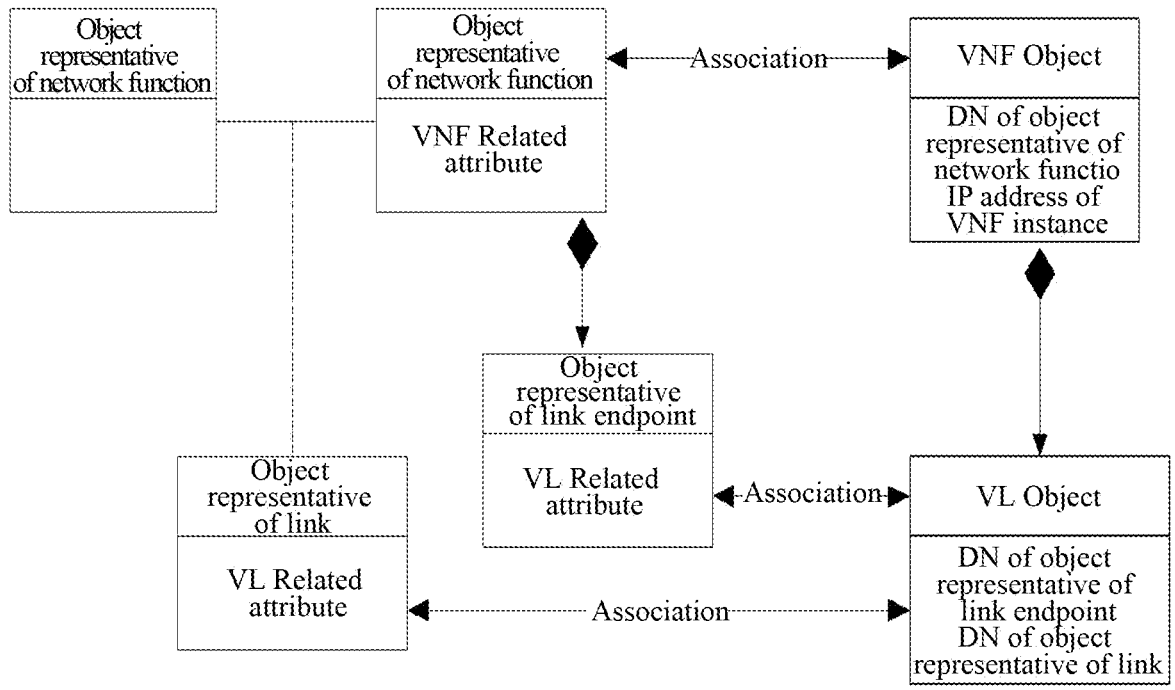
FIG. 4 is a schematic diagram of establishment of a correspondence via an association mode according to an embodiment of the present disclosure.

In an embodiment, FIG. 4 is a schematic diagram of establishment of a correspondence via an association mode according to the embodiment of the present disclosure. As shown in FIG. 4, the correspondence may be established via the association mode, that is, objects representative of VNFs and VLs are added to a management information base, herein there is a correspondence between the newly added VNF objects and their corresponding objects representative of network functions, and there is a correspondence between the newly added VL objects and their corresponding objects representative of links and objects representative of link endpoints. Related attributes identifying opposite ends are added to the objects at the two ends of the above-mentioned correspondence. IDs of the VNF instances and IP addresses of the VNF instances may be included in attributes of the VNF objects, and IDs of the VL instances may be included in the VL objects.

Alternatively, the above-mentioned performance measurement objects may include: network function object instances, link object instances and link endpoint object instances. In Step S302, establishing the correspondence between the performance measurement objects and the VNFs in the management information base may include the following steps:

Step S8: adding the VNF object instances and the VL object instances to the management information base, herein second identification information of the VNFs is contained in the VNF object instances, and third identification information of the VLs is contained in the VL object instances;

Step S9: establishing an association between the VNF object instances and the network function object instances, herein related attribute information corresponding to the network function object instances is added to the VNF object instances and related attribute information corresponding to the VNF object instances is added to the network function object instance; or establishing an inclusion relation between the VNF object instances and the network function object instances;

Step S10: establishing an association between the VL object instances and the link object instances, herein related attribute information corresponding to the link object instances is added to the VL object instances and related attribute information corresponding to the VL object instances is added into the link object instances; and Step S11: establishing an association between the VL object instances and the link endpoint object instances, herein related attribute information corresponding to the link endpoint object instances is added to the VL object instances and related attribute information corresponding to the VL object instances is added to the link endpoint object instances.

Figure 5:
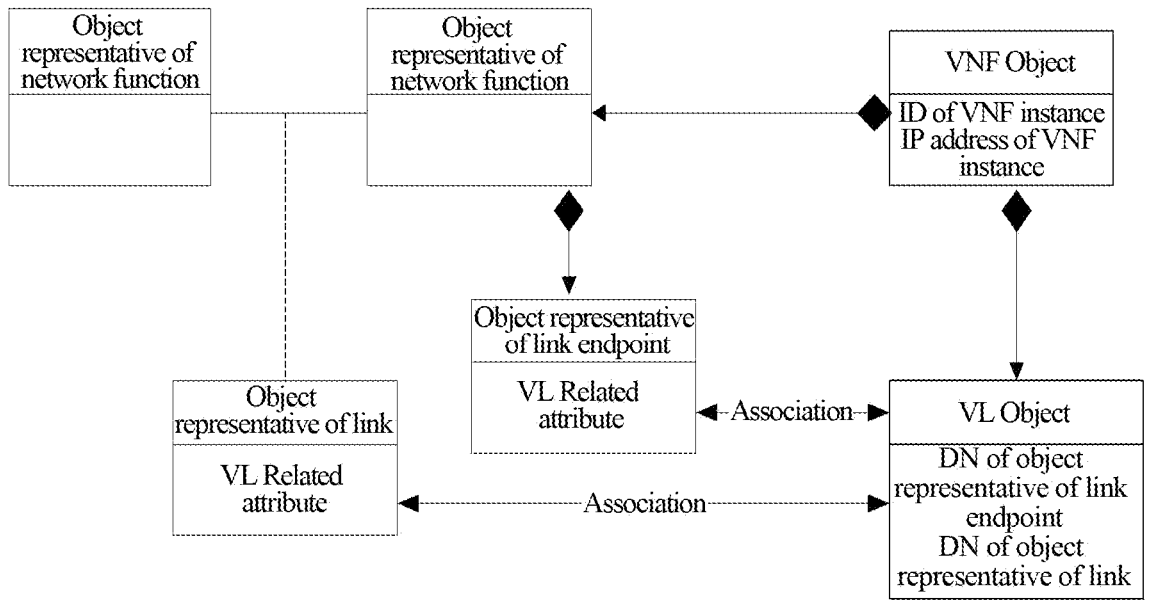
FIG. 5 is a schematic diagram of establishment of a correspondence via an inclusion relation mode according to an embodiment of the present disclosure.

In an embodiment, FIG. 5 is a schematic diagram of establishment of a correspondence via an inclusion relation mode according to an embodiment of the present disclosure. As shown in FIG. 5, the correspondence may also be established via the inclusion relation mode, that is, objects representative of VNFs and VLs are added to a management information base, herein the newly added VNF objects may contain objects representative of network functions, IDs of VNF instances and IP addresses of the VNF instances may be included in attributes of the VNF objects. There is a correspondence between the newly added VL objects and their corresponding objects representative of links and link endpoint objects. Related attributes identifying opposite ends are added to the objects at the two ends of the above-mentioned correspondence. IDs of the VL instances may be included in attributes of the VL objects.

Alternatively, the above-mentioned performance measurement objects may include: network function object instances, link object instances and link endpoint object instances. In Step S302, establishing the correspondence between the performance measurement objects and the VNFs in the management information base may include the following steps:

Step S12: adding second identification information of the VNFs to the network function object instances; and Step S13: adding third identification information of the VLs to the link object instances or the link endpoint object instances.

Figure 6:
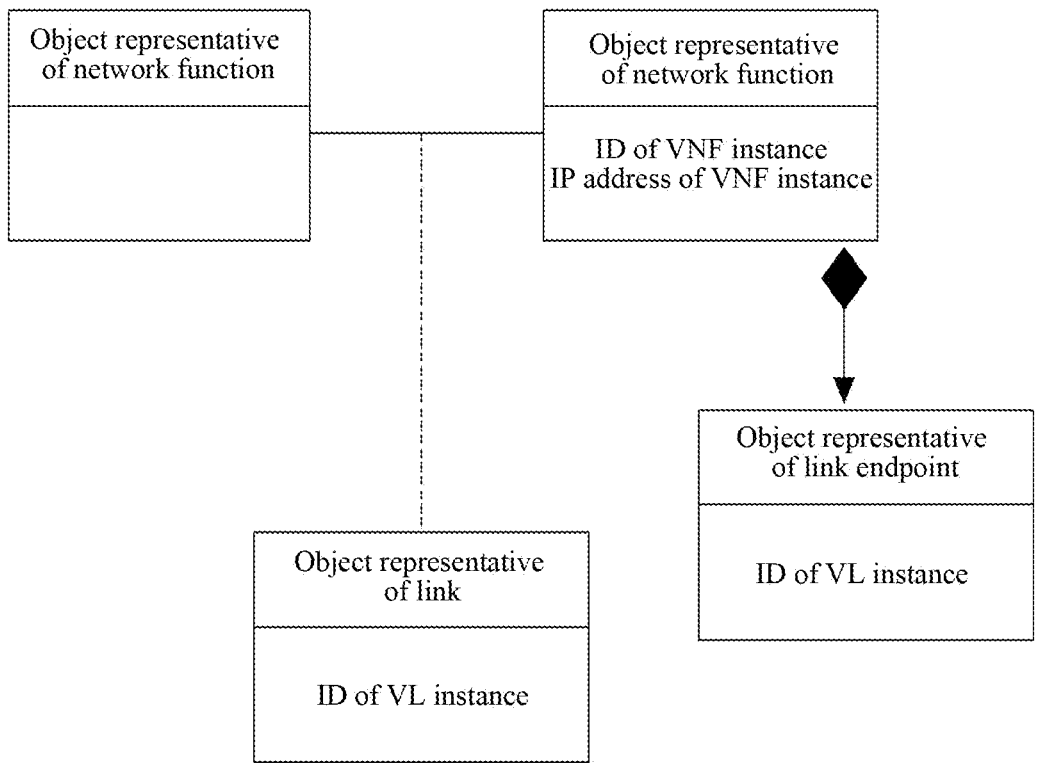
FIG. 6 is a schematic diagram of establishment of a correspondence via an attribute mode according to an embodiment of the present disclosure.

In an embodiment, FIG. 6 is a schematic diagram of establishment of a correspondence via an attribute mode according to the embodiment of the present disclosure. As shown in FIG. 6, the correspondence may also be established via the attribute mode, that is, attributes such as ID of VNF instances and IP addresses of the VNF instances are added directly under objects representative of network functions in a management information base; and attributes such as IDs of VL instances are added directly under objects representative of links or link endpoints.

In an implementation process, related attribute information corresponding to the VNF object instances is carried in a header of a performance measurement file and/or an element identity attribute of the performance measurement file; and related attribute information corresponding to the VL object instances is carried in a measurement value attribute of the performance measurement file. That is, identification information of performance measurement objects after network functions are virtualized may be added to a performance measurement file template, herein the IDs of the VNF instances corresponding to the objects representative of the network functions are carried in the header of the performance measurement file and/or the element identity attribute, and the IDs of the VL instances corresponding to the object representative of the links and the objects representative of the link endpoints are carried in the measurement value attribute.

Figure 7:
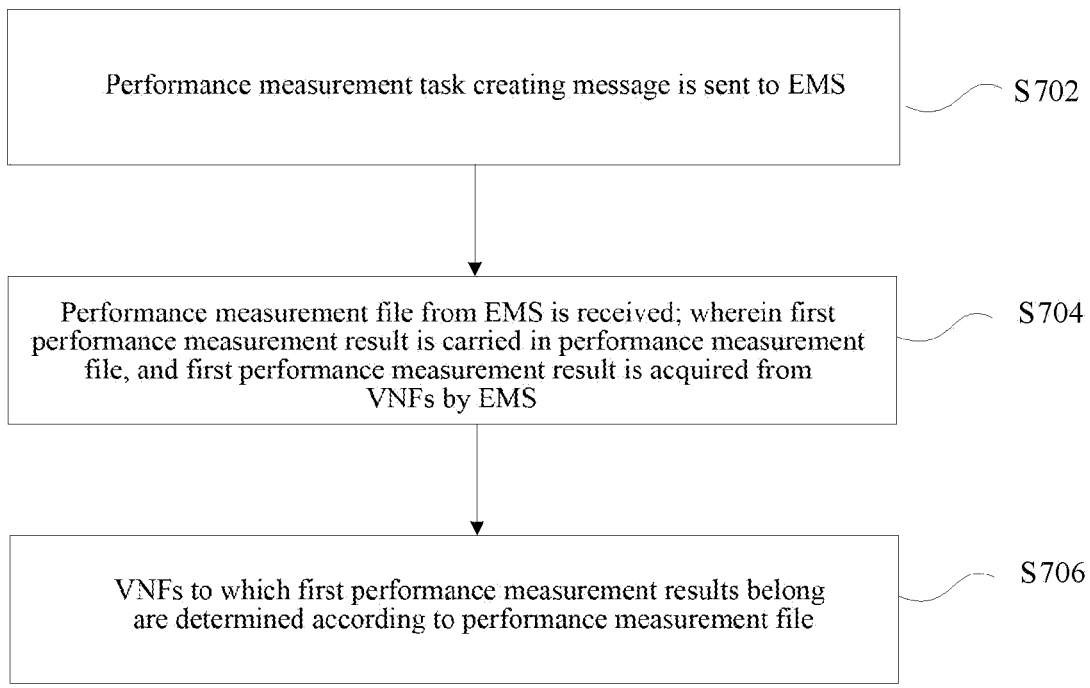
FIG. 7 is a flowchart of a method for processing performance measurement results according to an embodiment of the present disclosure.

FIG. 7 is a flowchart of a method for processing performance measurement results according to an embodiment of the present disclosure. As shown in FIG. 7, the method may include the following processing steps:

Step S702: sending a performance measurement task creating message to an EMS; Step S704: receiving a performance measurement file from the EMS, herein a first performance measurement result is carried in the performance measurement file, and the first performance measurement result is acquired from VNFs by the EMS; and Step S706: determining the VNFs to which the first performance measurement result belongs according to the performance measurement file.

Alternatively, the EMS acquiring the first performance measurement result from the VNFs may include one of:

Mode 1: the EMS acquires first identification information of performance measurement objects from the performance measurement task creating message, determines second identification information of the VNFs, corresponding to the first identification information, and then acquires the first performance measurement result from the VNFs according to the second identification information; and Mode 2: the EMS acquires second identification information from the performance measurement task creating message, and then acquires the first performance measurement result from the VNFs according to the second identification information.

Alternatively, in Step S706, after the VNFs to which the first performance measurement result belongs are determined according to the performance measurement file, the method further includes the following steps:

Step S14: acquiring a second performance measurement result corresponding to the second identification information from a NFVO; and Step S15: statistically analyzing the first performance measurement result and the second performance measurement result, assessing the quality of network services provided by the VNFs, and/or determining whether the VNF capacity is required to be adjusted.

In an embodiment, after receiving the performance measurement file sent by the EMS, an OSS/NMS may determine whether ID information of the VNF instances is contained in a header and element identity of the performance measurement file, and perform performance measurement on links or link endpoints, and then determine whether corresponding ID information of VL instances is contained in a measurement value attribute. If it is determined that the ID information of the VNF instances is contained in the header and element identity of the performance measurement file and/or it is determined the ID information of the VL instances is contained in the measurement value attribute, then other performance measurement results related to the VNF instances may be acquired from the NFVO according to identification information of the VNF instances, all performance measurement results of the VNF instances are statistically analyzed, the quality of network services provided by the VNF instances is assessed, and it is determined whether the VNF capacity is required to be adjusted.

Figure 8:
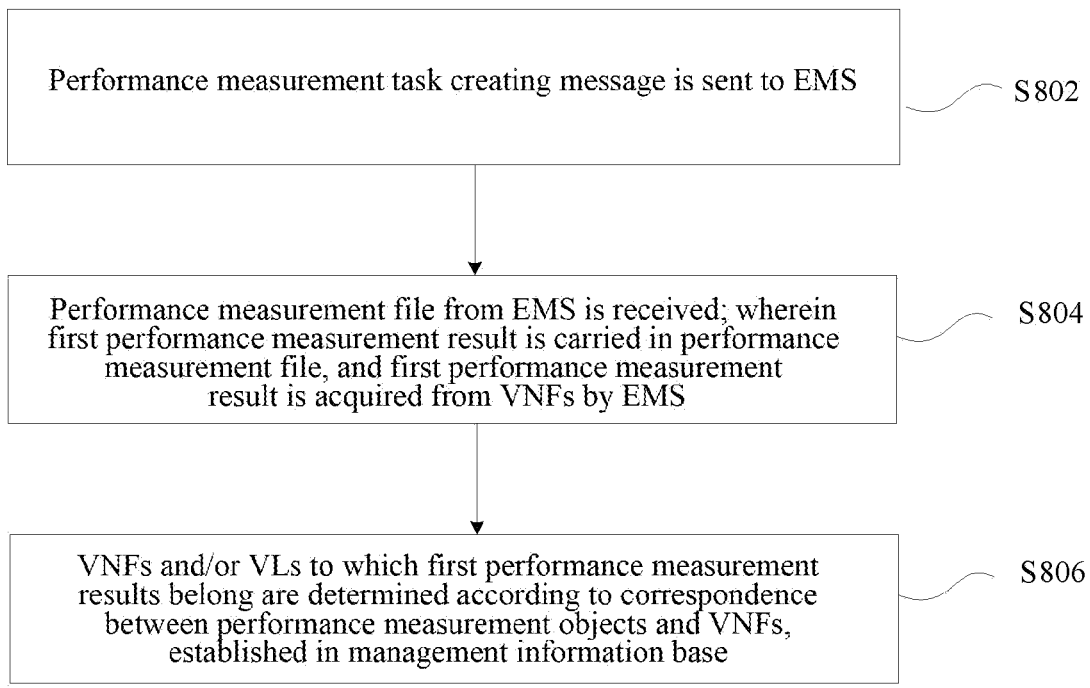
FIG. 8 is a flowchart of another method for processing performance measurement results according to an embodiment of the present disclosure.

FIG. 8 is a flowchart of another method for processing performance measurement results according to an embodiment of the present disclosure. As shown in FIG. 8, the method may include the following processing steps:

Step S802: sending a performance measurement task creating message to an EMS;

Step S804: receiving a performance measurement file from the EMS, herein a first performance measurement result is carried in the performance measurement file carries, and the first performance measurement result is acquired from VNFs by the EMS; and Step S806: determining the VNFs and/or VLs to which the first performance measurement result belongs according to a correspondence between performance measurement objects and the VNFs, established in a management information base.

Alternatively, the EMS acquiring the first performance measurement result from the VNFs may include one of:

Mode 1: the EMS acquires first identification information of the performance measurement objects from a performance measurement task creating message, determines second identification information of the VNFs, corresponding to the first identification information, and then acquires the first performance measurement result from the VNFs according to the second identification information; and Mode 2: the EMS acquires second identification information from a performance measurement task creating message, and then acquires the first performance measurement result from the VNFs according to the second identification information.

Alternatively, in Step S806, after the VNFs and/or VLs to which the first performance measurement result belongs are determined according to the correspondence, the method further includes the following steps:

Step S16: acquiring a second performance measurement result corresponding to the second identification information from a NFVO; and Step S17: statistically analyzing the first performance measurement result and the second performance measurement result, assessing the quality of network services provided by the VNFs, and/or determining whether the VNF capacity is required to be adjusted.

Alternatively, the above-mentioned performance measurement objects may be network function object instances. In Step S806, determining the VNFs to which the first performance measurement result belongs according to the correspondence may include, but is not limited to, one of:

(1) reading related attribute information corresponding to VNF object instances in the network function object instances, then reading second identification information in the VNF object instances represented by the related attribute information, and determining the VNFs to which the first performance measurement result belongs according to the second identification information;

(2) reading second identification information in VNF object instances containing the network function object instances, and determining the VNFs to which the first performance measurement result belongs according to the second identification information; and (3) reading second identification information of the VNFs in attributes of the network function object instances, and determining the VNFs to which the first performance measurement result belongs according to the second identification information of the VNFs.

In an embodiment, after receiving the performance measurement file sent by the EMS, an OSS/NMS determines VNF instances to which a performance measurement value of an application layer belongs according to the following manner. The OSS/NMS determines whether ID information of the VNF instances is contained in a header and element identity of the performance measurement file, and performs performance measurement on links or link endpoints, and then determines whether corresponding ID information of VL instances is contained in a measurement value attribute. If the ID information of the VNF instances and the VL instances is not contained in the performance measurement file, then the VNF instances may be determined according to the following manner. When measurement objects are DNs of object instances representative of network functions, if a correspondence is established using an association mode, the OSS/NMS reads VNF related attribute values under the object instances representative of the network functions, namely, DNs of corresponding VNF object instances, and then acquires IDs of the VNF instances from attributes of the VNF object instances according to the DNs. If the correspondence is established using an inclusion relation mode, the IDs of the VNF instances are read in the VNF object instances containing the object instances representative of the network functions. If the correspondence is established using an attribute mode, the IDs of the VNF instances are read in the attributes of the object instances representative of the network functions.

Alternatively, the above-mentioned performance measurement object may be link object instances. In Step S806, determining the VNFs to which the first performance measurement result belongs according to the correspondence may include, but is not limited to, one of:

(1) determining VNFs to which network function object instances related to the link object instances belong, and using the VNFs as the VNFs to which the first performance measurement result belongs; and (2) reading second identification information from the VNF object instances containing VL object instances, and determining the VNFs to which the first performance measurement result belongs according to the second identification information.

Alternatively, the above-mentioned performance measurement object may be link object instances. In Step S806, determining VLs to which the first performance measurement result belongs according to the correspondence may include, but is not limited to, one of:

(1) reading related attribute information corresponding to the VLs in the link object instances, then reading third identification information of the VLs in the VL object instances represented by the related attribute information, and determining the VLs to which the first performance measurement result belongs according to the third identification information; and (2) reading third identification information in attributes of the link object instances, and determining the VLs to which the first performance measurement result belongs according to the third identification information.

In an embodiment, when measurement objects are DNs of object instances representative of links, if a correspondence is established using an association mode, the OSS/NMS reads VL related attribute values under the object instances representative of the links, namely, DNs of corresponding VL object instances, and then acquires IDs of the VL instances from attributes of the VL object instances according to the DNs. If the correspondence is established using an attribute mode, the IDs of the VL instances are acquired in the attributes of the object instances representative of the links, then objects representative of network functions associated with the objects representative of the links are determined, and IDs of the VNF instances corresponding to the associated objects representative of the network functions are acquired, that is, VNF instances to which the object instances representative of the links belong; or the IDs of the VNF instances are acquired from the VNF object instances containing the VL object instances.

Alternatively, the above-mentioned performance measurement objects may be link endpoint object instances. In Step S806, determining the VNFs to which the first performance measurement result belongs according to the correspondence may include, but is not limited to, one of:

(1) determining VNFs to which network function object instances containing the link endpoint object instances belong, and using the VNFs as the VNFs to which the first performance measurement result belongs; and (2) reading second identification information from VNF object instances containing VL object instances, and determining the VNFs to which the first performance measurement result belongs according to the second identification information.

Alternatively, the above-mentioned performance measurement object may be link endpoint object instances. In Step S806, determining VLs to which the first performance measurement result belongs according to the correspondence may include, but is not limited to, one of:

(1) reading related attribute information corresponding to the VLs in the link endpoint object instances, then reading third identification information of the VLs in the VL object instances represented by the related attribute information, and determining the VLs to which the first performance measurement result belongs according to the third identification information; and (2) reading third identification information in attributes of the link endpoint object instances, and determining the VLs to which the first performance measurement result belongs according to the third identification information.

In an embodiment, when measurement objects are DNs of object instances representative of link endpoints, if a correspondence is established using an association mode, the OSS/NMS reads VL related attribute values under the object instances representative of the link endpoints, namely, DNs of corresponding VL object instances, and then acquires IDs of the VL instances from attributes of the VL object instances according to the DNs. If the correspondence is established using an attribute mode, the IDs of the VL instances are acquired in the attributes of the object instances representative of the link endpoints, then objects instances representative of network functions containing the objects representative of the link endpoints are determined, and IDs of the VNF instances corresponding to the objects instances representative of the network functions are acquired, that is, VNF instances to which the object instances representative of the link endpoints belong; or the IDs of the VNF instances are acquired from the VNF object instances containing the VL object instances.

The above-mentioned implementation processes will be further described below in conjunction with implementation modes shown in embodiment 1 to embodiment 5.

Embodiment 1

Suppose that a VNF instance implements an MRFC function, a DN of an MRFCFunction object instance in a management information base is MRFC-1, a DN of a VNF object instance is VNF-1, and an ID of an MRFC VNF instance is VNF-MRFC-1.

(1) An OSS/NMS and an EMS create an MRFCFunction instance and a VNF object instance in the management information base by configuring a management function, an associationAssociation is added, and a VNF related attribute RelatedVNF is added under the MRFCFunction instance.

(2) The OSS/NMS sends a created performance measurement task to the EMS, herein the performance measurement task creating may include performance measurement of MRFC-1.

(3) The EMS determines the MRFCFunction object instance in the management information base according to MRFC-1, queries a RelatedVNF attribute value of the object instance, that is, DN VNF-1 of the corresponding VNF object instance, acquires the ID VNF-MRFC-1 of the MRFC VNF instance from an attribute of the VNF object instance according to VNF-1, and sends a measurement task creating message to an MRFC VNF.

(4) The EMS receives performance measurement results sent by the MRFC VNF, generates a performance measurement file according to a performance measurement file template, and adds the ID VNF-MRFC-1 of the MRFC VNF instance to sender information of a header of the performance measurement file.

(5) The EMS sends the performance measurement file to the OSS/NMS according to a report cycle.

(6) The OSS/NMS receives the performance measurement file sent by the EMS, and acquires the ID VNF-MRFC-1 of the MRFC VNF instance from the header of the performance file, which means that all performance measurement results in the performance measurement file come from VNF-MRFC-1.

(7) The OSS/NMS acquires other performance measurement results related to VNF-MRFC-1 from an NFVO, statistically analyzes all performance measurement results of the MRFC VNF, assesses the quality of network services provided by the MRFC VNF, and determines whether the capacity is required to be adjusted.

Embodiment 2

Suppose that a VNF instance implements an MRFC function, a DN of an MRFCFunction object instance in a management information base is MRFC-2, and an ID of an MRFC VNF instance is VNF-MRFC-2.

(1) An OSS/NMS and an EMS create an MRFCFunction instance and a VNF object instance in the management information base by configuring a management function, the MRFCFunction object instance is contained under the VNF object instance, and an ID of a VNF instance is contained in an attribute of the VNF object instance.

(2) The OSS/NMS sends a created performance measurement task to the EMS, herein the created performance measurement task may include performance measurement of MRFC-2.

(3) The EMS determines the MRFCFunction object instance in the management information base according to MRFC-2, queries the ID VNF-MRFC-2 of the MRFC VNF instance in the attribute of the VNF object instance containing the MRFCFunction object instance, and sends a measurement task creating message to an MRFC VNF.

(4) The EMS receives performance measurement results sent by the MRFC VNF, and generates a performance measurement file according to a performance measurement file template, herein ID information of the MRFC VNF instance is not carried in the performance measurement file.

(5) The EMS sends the performance measurement file to the OSS/NMS according to a report cycle.

(6) The OSS/NMS receives the performance measurement file sent by the EMS, determines the MRFCFunction object instance in the management information base via DN information MRFC-2 of a measurement object, and queries the ID VNF-MRFC-2 of the corresponding VNF instance in the attribute of the VNF object instance containing the MRFCFunction object instance.

(7) The OSS/NMS acquires other performance measurement results related to VNF-MRFC-2 from an NFVO, statistically analyzes all performance measurement results of the MRFC VNF, assesses the quality of network services provided by the MRFC VNF, and determines whether the capacity is required to be adjusted.

Embodiment 3

Suppose that a VNF instance implements an MME function, a DN of an MMEFunction object instance in a management information base is MME-1, an endpoint of a link between an MME and an HSS at an MME side is identified by an EP_RP_EPS object instance of which a DN is EP_RP_S6a-1, a DN of a VNF object instance is VNF-3, a DN of a VL object instance is VL-1, an ID of an MME VNF instance is VNF-MME-1, and an ID of a VL instance between the MME and the HSS is VL-Sha-1.

(1) An OSS/NMS and an EMS create an MMEFunction object instance and a VNF object instance in the management information base by configuring a management function, an association Association1 between the MMEFunction object instance and the VNF object instance is added, and a VNF related attribute RelatedVNF1 is added under the MMEFunction instance. Meanwhile, an EP_RP_EPS object instance and a VL object instance are created, an association Association2 therebetween is added, and a VL related attribute RelatedVL1 is added under the EP_RP_EPS object instance. The EP_RP_EPS object instance is contained under the MMEFunction object instance, and the VL object instance is contained under the VNF object instance.

(2) The OSS/NMS sends a created performance measurement task to the EMS, herein the created performance measurement task may include performance measurement of EP_RP_Sha-1.

(3) The EMS determines the EP_RP_EPS object instance according to EP_RP_S6a-1, queries a RelatedVL1 attribute value of the object instance, that is, DN VL-1 of the VL object instance, and acquires the ID VL-S6a-1 of the VL instance from the VL object instance according to VL-1. Then, the EMS queries a RelatedVNF1 attribute value in an attribute of the MMEFunction object instance containing the EP_RP_EPS object instance, that is, the DN VNF-3 of the VNF object instance, acquires the ID VNF-MME-1 of the MME VNF instance from the VNF object instance according to VNF-3, and sends a measurement task creating message to an MME VNF.

(4) The EMS receives performance measurement results sent by the MME VNF, generates a performance measurement file according to a performance measurement file template, adds the ID VNF-MME-1 of the MME VNF instance to an element identity of a header of the performance measurement file, and adds the ID VL-S6a-1 of the VL instance to a measurement value attribute.

(5) The EMS sends the performance measurement file to the OSS/NMS according to a report cycle.

(6) The OSS/NMS receives the performance measurement file sent by the EMS, acquires the ID VNF-MME-1 of the MME VNF instance from an attribute of a network identification tag of the performance measurement file, and acquires the VL instance of which the ID is VL-S6a-1 from the measurement value attribute of a performance measurement object EP_RP_S6a-1.

(7) The OSS/NMS acquires other performance measurement results related to MME VNF from an NFVO, statistically analyzes all performance measurement results of the MME VNF, and determines whether bandwidth is required to be adjusted for VL-S6a-1.

Embodiment 4

Suppose that a VNF instance implements an MME function, a DN of an MMEFunction object instance in a management information base is MME-2, an endpoint of a link between an MME and an HSS at an MME side is identified by an EP_RP_EPS object instance of which a DN is EP_RP_S6a-2, a DN of a VL object instance is VL-2, an ID of an MME VNF instance is VNF-MME-2, and an ID of a VL instance between the MME and the HSS is VL-S6a-2.

(1) An OSS/NMS and an EMS create an MMEFunction object instance and a VNF object instance in the management information base by configuring a management function, the MMEFunction object instance is contained under the VNF object instance, and an ID of a VNF instance is contained in the VNF object instance. Meanwhile, an EP_RP_EPS object instance and a VL object instance are created, an association Association3 therebetween is added, and a VL related attribute RelatedVL2 is added under the EP_RP_EPS object instance. The EP_RP_EPS object instance is contained under the MMEFunction object instance, and the VL object instance is contained under the VNF object instance.

(2) The OSS/NMS sends a created performance measurement task to the EMS, herein the created performance measurement task may include performance measurement of EP_RP_Sha-2.

(3) The EMS determines the EP_RP_EPS object instance according to EP_RP_S6a-2, queries a RelatedVL2 attribute value of the object instance, that is, DN VL-2 of the VL object instance, acquires the ID VL-S6a-2 of the VL instance from the VL object instance according to VL-2, acquires the ID VNF-MME-2 of the MME VNF instance from the VNF object instance containing the VL object instance, and sends a measurement task creating message to an MME VNF.

(4) The EMS receives performance measurement results sent by the MME VNF, and generates a performance measurement file according to a performance measurement file template, herein the ID information of the MME VNF instance and the VL instance is not carried in the performance measurement file.

(5) The EMS sends the performance measurement file to the OSS/NMS according to a report cycle.

(6) The OSS/NMS receives the performance measurement file sent by the EMS, determines the EP_RP_EPS object instance according to EP_RP_S6a-2 via DN information EP_RP_S6a-2 of a measurement object, queries a RelatedVL2 attribute value of the object instance, namely, the DN VL-2 of the VL object instance, acquires the ID VL-S6a-2 of the VL instance from the VL object instance according to VL-2, and acquires the ID VNF-MME-2 of the MME VNF instance from the VNF object instance containing the VL object instance.

(7) The OSS/NMS acquires other performance measurement results related to VNF-MME-2 from an NFVO, statistically analyzes all performance measurement results of the MME VNF, and determines whether bandwidth is required to be adjusted for VL-S6a-2.

Embodiment 5

Suppose that a VNF instance implements an MRFC function, a DN of an MRFCFunction object instance in a management information base is MRFC-2, a link between an MRFCFunction and an MRFPFunction is identified by a Link_MRFC-MRFP instance of which a DN is MRFC_M-RFP_Mp-1, an ID of an MRFC VNF instance is VNF-MRFC-2, and an ID of a VL instance between the MRFC and the MEFP is VL-Mp-1.

(1) An OSS/NMS and an EMS create an MRFCFunction object instance and a Link_MRFC-MRFP object instance in the management information base by configuring a management function, herein an ID of an MRFC VNF instance is contained in an attribute of the MRFCFunction object instance, and an ID of a VL instance is contained in an attribute of the Link_MRFC-MRFP object instance.

(2) The OSS/NMS sends a created performance measurement task to the EMS, herein the created performance measurement task may include performance measurement of MRFC_MRFP_Mp-1.

(3) The EMS determines the Link_MRFC-MRFP object instance according to MRFC_MRFP_Mp-1, acquires the ID VL-Mp-1 of the VL instance from the attribute of the object instance, acquires a DN of the MRFCFunction object instance from the attribute of the Link_MRFC-MRFP object instance, and then acquires the ID VNF-MRFC-2 of the MRFC VNF instance from the attribute of the corresponding MRFCFunction object instance according to the DN.

(4) The EMS receives performance measurement results sent by the MME VNF, and generates a performance measurement file according to a performance measurement file template, herein ID information of the MRFC VNF instance and VL instance is not carried in the performance measurement file.

(5) The EMS sends the performance measurement file to the OSS/NMS according to a report cycle.

(6) The OSS/NMS receives the performance measurement file sent by the EMS, determines the Link_MRFC-MRFP object instance via MRFC MRFP Mp-1, acquires the ID VL-Mp-1 of the VL instance from the attribute of the object instance, acquires a DN of the MRFCFunction object instance from the attribute of the Link_MRFC-MRFP object instance, and then acquires the ID VNF-MRFC-2 of the MRFC VNF instance from the attribute of the corresponding MRFCFunction object instance according to the DN.

(7) The OSS/NMS acquires other performance measurement results related to VNF-MRFC-2 from an NFVO, statistically analyzes all performance measurement results of the MRFC VNF, and determines whether bandwidth is required to be adjusted for VL-Mp-1.

Figure 9:
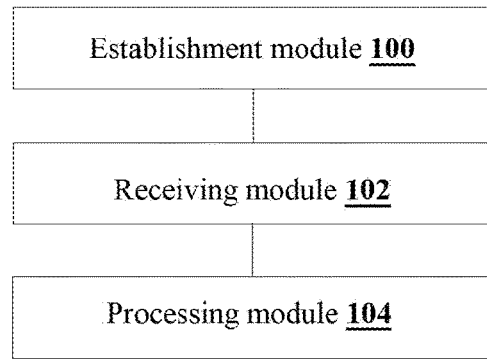
FIG. 9 is a structure block diagram of a processing apparatus for creating a performance measurement task according to an embodiment of the present disclosure.

FIG. 9 is a structure block diagram of a processing apparatus for creating a performance measurement task according to an embodiment of the present disclosure. As shown in FIG. 9, the processing apparatus for creating the performance measurement task may include: an establishment module 100 arranged to establish performance measurement objects and a correspondence between VNFs and the performance measurement objects in a management information base; a receiving module 102 arranged to receive a first performance measurement task creating message from an OSS or a NMS; and a processing module 104 arranged to acquire performance measurement results from the VNFs according to the first performance measurement task creating message, and report a performance measurement file to the OSS or the NMS, herein the performance measurement results are carried in the performance measurement file.

Figure 10:
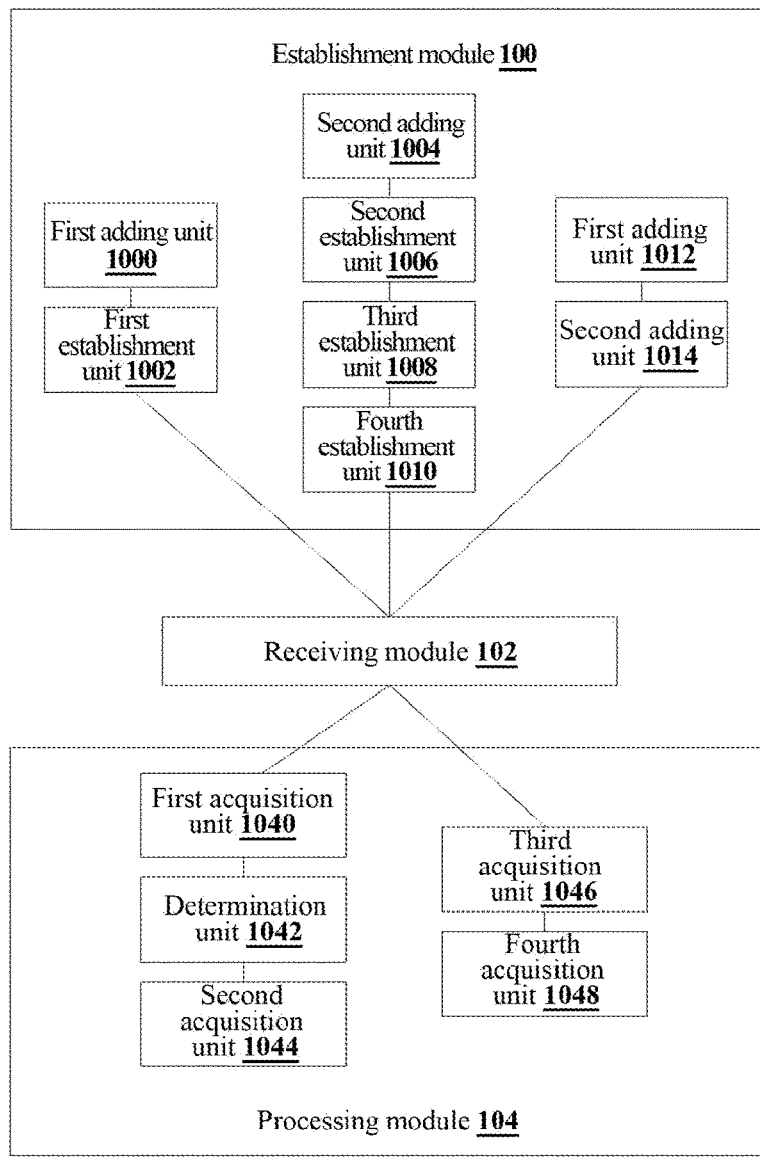
FIG. 10 is a structure block diagram of a processing apparatus for creating a performance measurement task according to an embodiment of the present disclosure.

Alternatively, as shown in FIG. 10, the processing module 104 may include: a first acquisition unit 1020 arranged to acquire first identification information of the performance measurement objects from the first performance measurement task creating message; a determination unit 1042 arranged to determine second identification information of the VNFs, corresponding to the first identification information; and a second acquisition unit 1044 arranged to acquire the performance measurement results from the VNFs according to the second identification information.

Alternatively, as shown in FIG. 10, the processing module 104 may include: a third acquisition unit 1046 arranged to acquire the second identification information of the VNFs from the first performance measurement task creating message; and a fourth acquisition unit 1048 arranged to acquire the performance measurement results from the VNFs according to the second identification information.

Alternatively, both the second acquisition unit 1044 and the fourth acquisition unit 1048 may include: a sending subunit (not shown in the figure) arranged to send a second performance measurement task creating message to the VNFs according to the second identification information; and a receiving subunit (not shown in the figure) arranged to receive the performance measurement results from the VNFs, and generate the performance measurement file according to a pre-set performance measurement file template, herein the performance measurement results are carried in the performance measurement file.

In an implementation process, the second identification information is further carried in the above-mentioned performance measurement file, herein the second identification information is used by the OSS or the NMS for determining the VNFs to which the performance measurement results belong.

Alternatively, as shown in FIG. 10, the above-mentioned performance measurement objects may include network function object instances. The establishment module 100 may includes: a first adding unit 1000 arranged to add VNF object instances to the management information base, herein the second identification information of the VNFs is contained in the VNF object instances; and a first establishment unit 1002 arranged to: establish an association between the VNF object instances and the network function object instances, herein related attribute information corresponding to the network function object instances is added to the VNF object instances and related attribute information corresponding to the VNF object instances is added to the network function object instances; or establish an inclusion relation between the VNF object instances and the network function object instances.

Alternatively, as shown in FIG. 10, the above-mentioned performance measurement objects may include: network function object instances, link object instances and link endpoint object instances. The establishment module 100 may include: a second adding unit 1004 arranged to add VNF object instances and VL object instances to the management information base, herein the second identification information of the VNFs is contained in the VNF object instances, and third identification information of VLs is contained in the VL object instances; a second establishment unit 1006 arranged to establish an inclusion relation between the VNF object instances and the network function object instances; a third establishment unit 1008 arranged to establish an association between the VL object instances and the link object instances, herein related attribute information corresponding to the link object instances is added to the VL object instances and related attribute information corresponding to the VL object instances is added to the link object instances; and a fourth establishment unit 1010 arranged to establish an association between the VL object instances and the link endpoint object instances, herein related attribute information corresponding to the link endpoint object instances is added to the VL object instances and related attribute information corresponding to the VL object instances is added to the link endpoint object instances.

Alternatively, as shown in FIG. 10, the above-mentioned performance measurement objects may include: network function object instances, link object instances and link endpoint object instances. The establishment module 100 may include: a first adding unit 1012 arranged to add the second identification information of the VNFs to the network function object instances; and a second adding unit 1014 arranged to add third identification information of VLs to the link object instances or the link endpoint object instances.

In an implementation process, the related attribute information corresponding to the VNF object instances or the second identification information of the VNFs is carried in a header of the performance measurement file and/or an element identity attribute of the performance measurement file; and the related attribute information corresponding to the VL object instances or the third identification information of the VLs is carried in a measurement value attribute of the performance measurement file.

Figure 11:
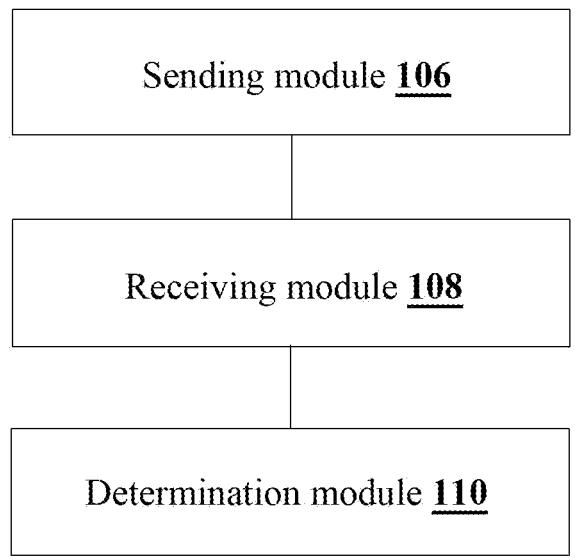
FIG. 11 is a structure block diagram of an apparatus for processing performance measurement results according to an embodiment of the present disclosure.

FIG. 11 is a structure block diagram of an apparatus for processing performance measurement results according to an embodiment of the present disclosure. As shown in FIG. 11, the apparatus for processing the performance measurement results may include: a sending module 106 arranged to send a performance measurement task creating message to an EMS; a receiving module 108 arranged to receive a performance measurement file from the EMS, herein a first performance measurement result is carried in the performance measurement file, and the first performance measurement result is acquired from VNFs by the EMS; and a determination module 110 arranged to determine the VNFs to which the first performance measurement result belongs according to the performance measurement file.

Alternatively, the EMS acquiring the first performance measurement result from the VNFs may include one of:

Mode 1: the EMS acquiring first identification information of performance measurement objects from the performance measurement task creating message, determining second identification information of the VNFs, corresponding to the first identification information, and then acquiring the first performance measurement result from the VNFs according to the second identification information; and Mode 2: the EMS acquiring second identification information from the performance measurement task creating message, and then acquiring the first performance measurement result from the VNFs according to the second identification information.

Figure 12:
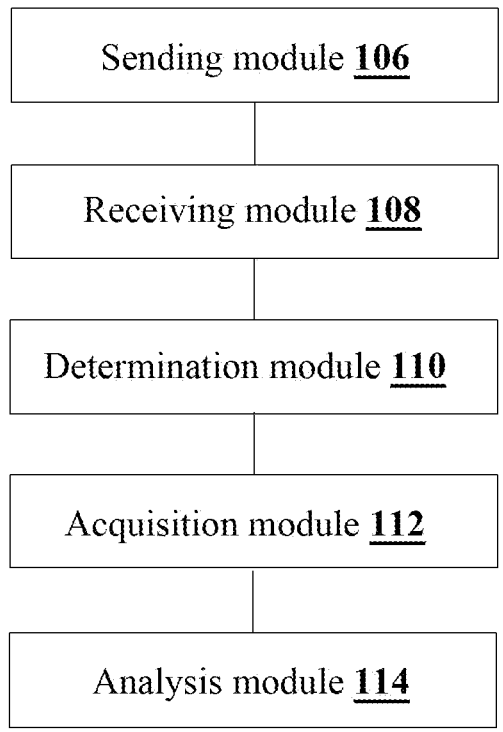
FIG. 12 is a structure block diagram of an apparatus for processing performance measurement results according to an embodiment of the present disclosure.

Alternatively, as shown in FIG. 12, the above-mentioned apparatus may further include: an acquisition module 112 arranged to acquire a second performance measurement result corresponding to the second identification information from a NFVO; and an analysis module 114 arranged to statistically analyze the first performance measurement result and the second performance measurement result, assess quality of network services provided by the VNFs, and/or determine whether VNF capacity is required to be adjusted.

Figure 13:
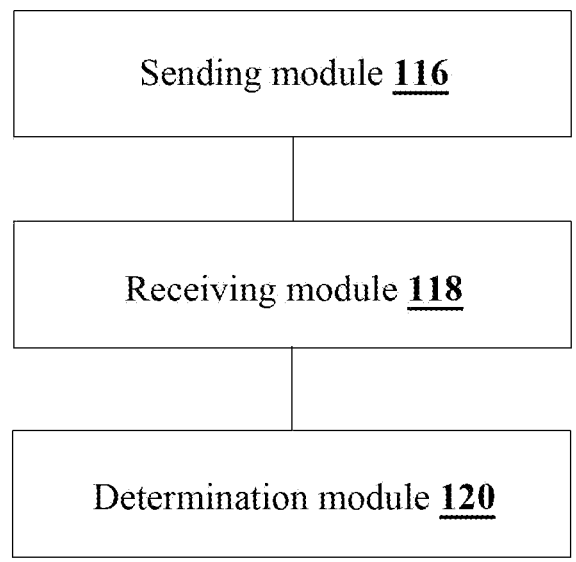
FIG. 13 is a structure block diagram of another apparatus for processing performance measurement results according to an embodiment of the present disclosure.

FIG. 13 is a structure block diagram of another apparatus for processing performance measurement results according to an embodiment of the present disclosure. As shown in FIG. 13, the apparatus for processing the performance measurement results may include: a sending module 116 arranged to send a performance measurement task creating message to an EMS; a receiving module 118 arranged to receive a performance measurement file from the EMS, herein a first performance measurement result is carried in the performance measurement file, and the first performance measurement result is acquired from VNFs by the EMS; and a determination module 120 arranged to determine the VNFs and/or VLs to which the first performance measurement result belongs according to a correspondence between performance measurement objects and the VNFs, established in a management information base.

Alternatively, the EMS acquiring the first performance measurement result from VNFs may include one of:

Mode 1: the EMS acquiring first identification information of the performance measurement objects from a performance measurement task creating message, determining second identification information of the VNFs, corresponding to the first identification information, and then acquiring the first performance measurement result from the VNFs according to the second identification information; and Mode 2: the EMS acquiring second identification information from a performance measurement task creating message, and then acquiring the first performance measurement result from the VNFs according to the second identification information.

Figure 14:
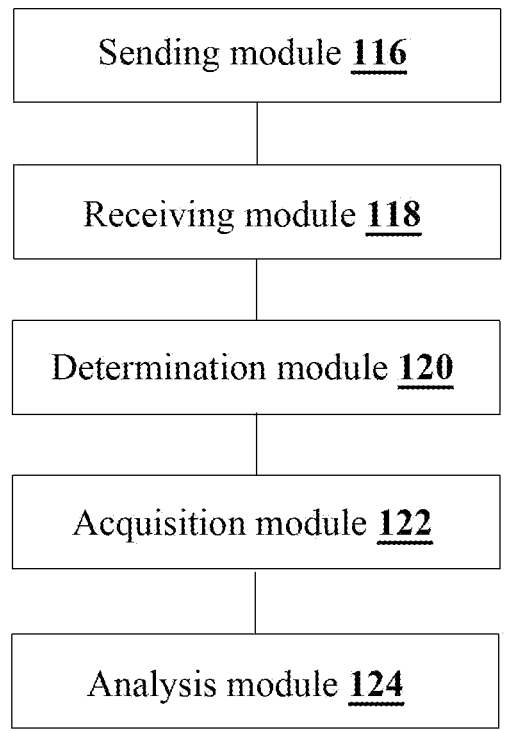
FIG. 14 is a structure block diagram of another apparatus for processing performance measurement results according to an embodiment of the present disclosure.

Alternatively, as shown in FIG. 14, the above-mentioned apparatus may further include: an acquisition module 122 arranged to acquire a second performance measurement result corresponding to the second identification information from a NFVO; and an analysis module 124 arranged to statistically analyze the first performance measurement result and the second performance measurement result, assess quality of network services provided by the VNFs, and/or determine whether VNF capacity is required to be adjusted.

Alternatively, the above-mentioned performance measurement objects may be network function object instances. The determination module 120 is arranged to: read related attribute information corresponding to VNF object instances in the network function object instances, then read second identification information in the VNF object instances represented by the related attribute information, and determine the VNFs to which the first performance measurement result belongs according to the second identification information; or read second identification information in VNF object instances containing the network function object instances, and determine the VNFs to which the first performance measurement result belongs according to the second identification information; or read second identification information of the VNFs in attributes of the network function object instances, and determine the VNFs to which the first performance measurement result belongs according to the second identification information of the VNFs.a network function object instance.

Alternatively, the above-mentioned performance measurement objects may be link object instances. The determination module 120 is arranged to: determine VNFs to which network function object instances related to the link object instances belong, and use the VNFs as the VNFs to which the first performance measurement result belongs; or read second identification information from the VNF object instances containing VL object instances, and determine the VNFs to which the first performance measurement result belongs according to the second identification information.

Alternatively, the above-mentioned performance measurement objects may be link object instances. The determination module 120 is arranged to: read related attribute information corresponding to the VLs in the link object instances, then read third identification information of the VLs in the VL object instances represented by the related attribute information, and determine the VLs to which the first performance measurement result belongs according to the third identification information; or read third identification information in attributes of the link object instances, and determine the VLs to which the first performance measurement result belongs according to the third identification information.

Alternatively, the above-mentioned performance measurement objects may be link endpoint object instances. The determination module 120 is arranged to: determine VNFs to which network function object instances containing the link endpoint object instances belong, and use the VNFs as the VNFs to which the first performance measurement result belongs; or read second identification information from VNF object instances containing VL object instances, and determine the VNFs to which the first performance measurement result belongs according to the second identification information.

Alternatively, the above-mentioned performance measurement objects may be link endpoint object instances. The determination module 120 is arranged to: read related attribute information corresponding to the VLs in the link endpoint object instances, then read third identification information of the VLs in the VL object instances represented by the related attribute information, and determine the VLs to which the first performance measurement result belongs according to the third identification information; or read third identification information in attributes of the link endpoint object instances, and determine the VLs to which the first performance measurement result belongs according to the third identification information.

From the above description, it may be seen that the above-mentioned embodiments achieve the following technical effects (it should be noted that these effects are effects that can be achieved by some embodiments). Using the technical schemes provided by the embodiments of the present disclosure, performance measurement items of an application layer are related to specific VNFs, thereby facilitating implementation of comprehensive and effective assessment of the quality of the VNFs and the processing capacity of virtual network devices.

Obviously, those skilled in the art should understand that various modules or steps of the present disclosure described above may be implemented by general-purpose computing devices that may be centralized on a single computing device or distributed over a network consisting of a plurality of computing devices. Optionally, the modules or steps may be implemented by program codes executable by the computing devices such that they may be stored in storage devices and executed by the computing devices, and in some cases, the steps shown or described may be executed in an order different from that shown herein. Or they may be made separately into individual integrated circuit modules, or some of them can be made into a single integrated circuit module. Thus, the present disclosure is not limited to any particular combination of hardware and software.

The above description is only embodiments of the present disclosure and is not intended to limit the present disclosure. Those skilled in the art should understand that the present disclosure may have various changes and modifications. Any modification, equivalent substitution, improvement and the like made within the spirit and principle of the present disclosure should be included in the protection scope of the present disclosure.

INDUSTRIAL APPLICABILITY

As described above, a processing method and apparatus for creating a performance measurement task and processing performance measurement results provided by the embodiments of the present disclosure have the following beneficial effects: performance measurement items of an application layer may be related to specific VNFs, thereby facilitating implementation of comprehensive and effective assessment of the quality of the VNFs and the processing capacity of virtual network devices.

What is claimed is:

1. A processing method for creating a performance measurement task, comprising:
   establishing performance measurement objects and a correspondence between virtual network functions (VNFs) and the performance measurement objects in a management information base;
   receiving a first performance measurement task creating message from an operation support system (OSS) or a network management system (NMS); and
   acquiring performance measurement results from the VNFs according to the first performance measurement task creating message, and reporting a performance measurement file to the OSS or the NMS, wherein the performance measurement results are carried in the performance measurement file.

2. The method according to claim 1, wherein acquiring performance measurement results from the VNFs according to the first performance measurement task creating message comprises:
   acquiring first identification information of the performance measurement objects from the first performance measurement task creating message;
   determining second identification information of the VNFs, corresponding to the first identification information; and
   acquiring the performance measurement results from the VNFs according to the second identification information,
   wherein acquiring the performance measurement results from the VNFs according to the second identification information comprises:
   sending a second performance measurement task creating message to the VNFs according to the second identification information; and
   receiving the performance measurement results from the VNFs, and generating the performance measurement file according to a pre-set performance measurement file template, wherein the performance measurement results are carried in the performance measurement file.

3. The method according to claim 1, wherein acquiring performance measurement results from the VNFs according to the first performance measurement task creating message comprises:
   acquiring second identification information of the VNFs from the first performance measurement task creating message; and
   acquiring the performance measurement results from the VNFs according to the second identification information;
   or
   wherein the second identification information is further carried in the performance measurement file, wherein the second identification information is used by the OSS or the NMS for determining the VNFs to which the performance measurement results belong.

4. The method according to claim 1, wherein the performance measurement objects include network function object instances; establishing a correspondence between VNFs and the performance measurement objects in a management information base comprises:
   adding VNF object instances to the management information base, wherein the second identification information of the VNFs is contained in the VNF object instances; and
   establishing an association between the VNF object instances and the network function object instances, wherein related attribute information corresponding to the network function object instances is added to the VNF object instances and related attribute information corresponding to the VNF object instances is added to the network function object instances; or establishing an inclusion relation between the VNF object instances and the network function object instances,
   wherein the related attribute information corresponding to the VNF object instances or the second identification information is carried in the performance measurement file; and the related attribute information corresponding to the VL object instances or the third identification information is carried in the performance measurement file.

5. The method according to claim 1, wherein the performance measurement objects include: network function object instances, link object instances and link endpoint object instances; establishing a correspondence between VNFs and the performance measurement objects in a management information base comprises:
   adding VNF object instances and virtual link, VL, object instances to the management information base, wherein the second identification information of the VNFs is contained in the VNF object instances, and third identification information of VLs is contained in the VL object instances;
   establishing an association between the VNF object instances and the network function object instances, wherein related attribute information corresponding to the network function object instances is added to the VNF object instances and related attribute information corresponding to the VNF object instances is added to the network function object instances; or establishing an inclusion relation between the VNF object instances and the network function object instances;
   establishing an association between the VL object instances and the link object instances, wherein related attribute information corresponding to the link object instances is added to the VL object instances and related attribute information corresponding to the VL object instances is added to the link object instances; and
   establishing an association between the VL object instances and the link endpoint object instances, wherein related attribute information corresponding to the link endpoint object instances is added to the VL object instances and related attribute information corresponding to the VL object instances is added to the link endpoint object instances;
   or
   wherein the performance measurement objects include: network function object instances, link object instances and link endpoint object instances; establishing a correspondence between VNFs and the performance measurement objects in a management information base comprises:
   adding the second identification information of the VNFs to the network function object instances; and adding third identification information of VLs to the link object instances or the link endpoint object instances.

6. A method for processing performance measurement results, comprising:
sending a performance measurement task creating message to an element management system (EMS);
receiving a performance measurement file from the EMS, wherein a first performance measurement result is carried in the performance measurement file, and the first performance measurement result is acquired from virtual network functions (VNFs) by the EMS; and
determining the VNFs and/or virtual links (VLs) to which the first performance measurement result belongs according to a correspondence between performance measurement objects and the VNFs, established in a management information base.

7. The method according to claim 6, wherein the EMS acquiring the first performance measurement result from VNFs comprises one of:
the EMS acquiring first identification information of the performance measurement objects from the performance measurement task creating message, determining second identification information of the VNFs, corresponding to the first identification information, and then acquiring the first performance measurement result from the VNFs according to the second identification information;
the EMS acquiring the second identification information from the performance measurement task creating message, and then acquiring the first performance measurement result from the VNFs according to the second identification information;
or
wherein after the VNFs and/or VLs to which the first performance measurement result belongs are determined according to the correspondence, the method further comprises:
acquiring a second performance measurement result corresponding to the second identification information from a network functions virtualization orchestrator (NFVO); and
statistically analyzing the first performance measurement result and the second performance measurement result, assessing quality of network services provided by the VNFs, and/or determining whether VNF capacity is required to be adjusted.

8. The method according to claim 6, wherein the performance measurement objects are network function object instance; determining the VNFs to which the first performance measurement result belongs according to a correspondence comprises one of:
reading related attribute information corresponding to VNF object instances in the network function object instances, then reading second identification information in the VNF object instances represented by the related attribute information, and determining the VNFs to which the first performance measurement result belongs according to the second identification information;
reading the second identification information in VNF object instances containing the network function object instances, and determining the VNFs to which the first performance measurement result belongs according to the second identification information;
reading second identification information of the VNFs in attributes of the network function object instances, and determining the VNFs to which the first performance measurement result belongs according to the second identification information of the VNFs;
or
wherein the performance measurement objects are link object instances; determining the VNFs to which the first performance measurement result belongs according to a correspondence comprises one of:
determining VNFs to which network function object instances related to the link object instances belong, and using the VNFs as the VNFs to which the first performance measurement result belongs;
reading the second identification information from the VNF object instances containing VL object instances, and determining the VNFs to which the first performance measurement result belongs according to the second identification information.

9. The method according to claim 6, wherein the performance measurement objects are link object instances; determining VLs to which the first performance measurement result belongs according to a correspondence comprises one of:
reading related attribute information corresponding to the VLs in the link object instances, then reading third identification information of the VLs in the VL object instances represented by the related attribute information, and determining the VLs to which the first performance measurement result belongs according to the third identification information;
reading third identification information in attributes of the link object instances, and determining the VLs to which the first performance measurement result belongs according to the third identification information;
or
wherein the performance measurement objects are link endpoint object instances;
determining the VNFs to which the first performance measurement result belongs according to a correspondence comprises one of:
determining VNFs to which network function object instances containing the link endpoint object instances belong, and using the VNFs as the VNFs to which the first performance measurement result belongs;
reading second identification information from VNF object instances containing VL object instances, and determining the VNFs to which the first performance measurement result belongs according to the second identification information.

10. The method according to claim 6, wherein the performance measurement objects are link endpoint object instances; determining VLs to which the first performance measurement result belongs according to a correspondence comprises one of:
reading related attribute information corresponding to the VLs in the link endpoint object instances, then reading third identification information of the VLs in the VL object instances represented by the related attribute information, and determining the VLs to which the first performance measurement result belongs according to the third identification information;
reading third identification information of VLs in attributes of the link endpoint object instances, and determining the VLs to which the first performance measurement result belongs according to the third identification information.

11. A processing apparatus for creating a performance measurement task, comprising: a processor and a memory, wherein the processor is configured to execute instructions in the memory, wherein the instructions comprise:

establishment instructions for establishing performance measurement objects and a correspondence between virtual network functions (VNFs) and the performance measurement objects in a management information base;

receiving instructions for receiving a first performance measurement task creating message from an operation support system (OSS) or a network management system (NMS); and processing instructions for acquiring performance measurement results from the VNFs according to the first performance measurement task creating message, and reporting a performance measurement file to the OSS or the NMS, wherein the performance measurement results are carried in the performance measurement file.

12. The apparatus according to claim 11, wherein the processing instructions comprise:

first acquisition instructions for acquiring first identification information of the performance measurement objects from the first performance measurement task creating message;

determination instructions for determining second identification information of the VNFs corresponding to the first identification information; and second acquisition instructions for acquiring the performance measurement results from the VNFs according to the second identification information, wherein both the second acquisition instructions and the first acquisition instructions comprise:

sending instructions for sending a second performance measurement task creating message to the VNFs according to the second identification information; and instructions for receiving the performance measurement results from the VNFs, and generating the performance measurement file according to a pre-set performance measurement file template, wherein the performance measurement results are carried in the performance measurement file.

13. The apparatus according to claim 11, wherein the processing instructions comprise:

third acquisition instructions for acquiring second identification information of the VNFs from the first performance measurement task creating message; and fourth acquisition instructions for acquiring the performance measurement results from the VNFs according to the second identification information;

or wherein the second identification information is further carried in the performance measurement file, wherein the second identification information is used by the OSS or the NMS for determining the VNFs to which the performance measurement results belong.

14. The apparatus according to claim 11, wherein the performance measurement objects include network function object instances; the establishment comprises instructions comprise:

first adding instructions for adding VNF object instances to the management information base, wherein second identification information of the VNFs is contained in the VNF object instances; and first establishment instructions for: establishing an association between the VNF object instances and the network function object instances, wherein related attribute information corresponding to the network function object instances is added to the VNF object instances and related attribute information corresponding to the VNF object instances is added to the network function object instances; or establishing an inclusion relation between the VNF object instances and the network function object instances, wherein the related attribute information corresponding to the VNF object instances or the second identification information is carried in the performance measurement file; and the related attribute information corresponding to the VL object instances or the third identification information is carried in the performance measurement file.

15. The apparatus according to claim 11, wherein the performance measurement objects include: network function object instances, link object instances and link endpoint object instances; the establishment instructions comprise:

second adding instructions for adding VNF object instances and virtual link (VL) object instances to the management information base, wherein second identification information of the VNFs is contained in the VNF object instances, and third identification information of VLs is contained in the VL object instances;

second establishment instructions for establishing an association between the VNF object instances and the network function object instances, wherein related attribute information corresponding to the network function object instances is added to the VNF object instances and related attribute information corresponding to the VNF object instance is added to the network function object instances; or establishing an inclusion relation between the VNF object instances and the network function object instances;

third establishment instructions for establishing an association between the VL object instances and the link object instances, wherein related attribute information corresponding to the link object instances is added to the VL object instances and related attribute information corresponding to the VL object instances is added to the link object instances; and fourth establishment instructions for establishing an association between the VL object instances and the link endpoint object instances, wherein related attribute information corresponding to the link endpoint object instances is added to the VL object instances and related attribute information corresponding to the VL object instances is added to the link endpoint object instances;

or wherein the performance measurement objects include: network function object instances, link object instances and link endpoint object instances; the establishment instructions comprise:

first adding instructions for adding second identification information of the VNFs to the network function object instances; and second adding instructions for adding third identification information of VLs to the link object instances or the link endpoint object instances.

16. An apparatus for processing performance measurement results, comprising: a processor and a memory, wherein the processor is configured to execute instructions in the memory, wherein the instructions comprise:

sending instructions for sending a performance measurement task creating message to an element management system (EMS);

receiving instructions for receiving a performance measurement file from the EMS, wherein a first performance measurement result is carried in the performance measurement file, and the first performance measurement result is acquired from virtual network functions (VNFs) by the EMS; and determination instructions for determining the VNFs and/ or virtual links (VLs) to which the first performance measurement result belongs according to a correspondence between performance measurement objects and the VNFs established in a management information base.

17. The apparatus according to claim 16, wherein the EMS acquiring the first performance measurement result from VNFs comprises one of:

the EMS acquiring first identification information of the performance measurement objects from a performance measurement task creating message, determining second identification information of the VNFs, corresponding to the first identification information, and then acquiring the first performance measurement result from the VNFs according to the second identification information;

the EMS acquiring second identification information from a performance measurement task creating message, and then acquiring the first performance measurement result from the VNFs according to the second identification information, wherein the instructions further comprise:

acquisition instructions for acquiring a second performance measurement result corresponding to the second identification information from a network functions virtualization orchestrator (NFVO); and analysis instructions for statistically analyzing the first performance measurement result and the second performance measurement result, assessing quality of network services provided by the VNFs, and/or determining whether VNF capacity is required to be adjusted.

18. The apparatus according to claim 16, wherein the performance measurement objects are network function object instances; the determination instructions comprise instructions for: reading related attribute information corresponding to VNF object instances in the network function object instances, then reading second identification information in the VNF object instances represented by the related attribute information, and determining the VNFs to which the first performance measurement result belongs according to the second identification information; or reading second identification information in VNF object instances containing the network function object instances, and determining the VNFs to which the first performance measurement result belongs according to the second identification information; or reading second identification information of the VNFs in attributes of the network function object instances, and determining the VNFs to which the first performance measurement result belongs according to the second identification information of the VNFs;

or wherein the performance measurement objects are link object instances; the determination instructions comprise instructions for: determining VNFs to which network function object instances related to the link object instances belong, and using the VNFs as the VNFs to which the first performance measurement result belongs; or reading second identification information from the VNF object instances containing VL object instances, and determining the VNFs to which the first performance measurement result belongs according to the second identification information.

19. The apparatus according to claim 16, wherein the performance measurement objects are link object instances; the determination instructions comprise instructions for: reading related attribute information corresponding to the VLs in the link object instances, then reading third identification information of the VLs in the VL object instances represented by the related attribute information, and determining the VLs to which the first performance measurement result belongs according to the third identification information; or reading third identification information in attributes of the link object instances, and determining the VLs to which the first performance measurement result belongs according to the third identification information;

or wherein the performance measurement objects are link endpoint object instances; the determination instructions comprise instructions for: determining VNFs to which network function object instances containing the link endpoint object instances belong, and using the VNFs as the VNFs to which the first performance measurement result belongs; or reading second identification information from VNF object instances containing VL object instances, and determining the VNFs to which the first performance measurement result belongs according to the second identification information.

20. The apparatus according to claim 16, wherein the performance measurement objects are link endpoint object instances; the determination module instructions comprise instructions for: reading related attribute information corresponding to the VLs in the link endpoint object instances, then reading third identification information of the VLs in the VL object instances represented by the related attribute information, and determining the VLs to which the first performance measurement result belongs according to the third identification information; or reading third identification information of VL in attributes of the link endpoint object instances, and determining the VLs to which the first performance measurement result belongs according to the third identification information.

* * * * *